(12) United States Patent
Sharman et al.

(10) Patent No.: US 12,137,231 B2
(45) Date of Patent: Nov. 5, 2024

(54) IMAGE DATA ENCODING AND DECODING

(71) Applicant: SONY GROUP CORPORATION, Tokyo (JP)

(72) Inventors: Karl James Sharman, Basingstoke (GB); Stephen Mark Keating, Basingstoke (GB); Magali Kimlee Miri Philippe, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/160,767

(22) Filed: Jan. 27, 2023

(65) Prior Publication Data

US 2023/0171413 A1 Jun. 1, 2023

Related U.S. Application Data

(63) Continuation of application No. 17/390,283, filed on Jul. 30, 2021, which is a continuation of application
(Continued)

(30) Foreign Application Priority Data

Oct. 27, 2017 (GB) .................................. 1717684
Jun. 1, 2018 (GB) .................................. 1809024

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .. H04N 19/159; H04N 19/105; H04N 19/167; H04N 19/11; H04N 19/593;
(Continued)

(56) References Cited

U.S. PATENT DOCUMENTS

2014/0247868 A1 9/2014 Oh et al.
2015/0189273 A1 7/2015 Oh et al.
(Continued)

FOREIGN PATENT DOCUMENTS

EP 3 148 190 A1 3/2017
JP 2012-191295 A 10/2012
(Continued)

OTHER PUBLICATIONS

International Search Report issued on Jan. 18, 2019 in PCT/GB2018/053077 filed on Oct. 24, 2018.
(Continued)

*Primary Examiner* — Nam D Pham
(74) *Attorney, Agent, or Firm* — Oblon, McClelland, Maier & Neustadt, L.L.P.

(57) ABSTRACT

An image encoding apparatus comprises a selector configured to select, from a set of candidate prediction operations each defining at least a prediction direction, a prediction operation for prediction of samples of a current region of a current image, the current region comprising an array of two or more rows and two or more columns of samples; an intra-image predictor configured to derive predicted samples of the current region with respect to one or more of a group of reference samples of the same image in dependence upon a prediction direction, defined by the selected prediction operation, between a current sample to be predicted and a reference position amongst the reference samples; in which, for at least some of the candidate prediction operations, the group of reference samples comprises two or more parallel
(Continued)

linear arrays of reference samples disposed at different respective separations from the current region; a detector configured to detect whether samples corresponding to any of the two or more parallel linear arrays of reference samples are unavailable for use in prediction of samples of the current region and, if any of the two or more parallel linear arrays of reference samples are unavailable, to inhibit selection, by the selector, of a candidate prediction operation dependent upon the unavailable reference samples.

21 Claims, 22 Drawing Sheets

Related U.S. Application Data

No. 16/753,139, filed as application No. PCT/GB2018/053077 on Oct. 24, 2018, now Pat. No. 11,159,803.

(51) Int. Cl.

| | |
|---|---|
| *H04N 19/11* | (2014.01) |
| *H04N 19/167* | (2014.01) |
| *H04N 19/176* | (2014.01) |
| *H04N 19/44* | (2014.01) |
| *H04N 19/513* | (2014.01) |
| *H04N 19/593* | (2014.01) |
| *H04N 19/60* | (2014.01) |

(52) U.S. Cl.
CPC ......... *H04N 19/167* (2014.11); *H04N 19/176* (2014.11); *H04N 19/45* (2014.11); *H04N 19/513* (2014.11); *H04N 19/593* (2014.11); *H04N 19/60* (2014.11)

(58) Field of Classification Search
CPC .... H04N 19/176; H04N 19/45; H04N 19/513; H04N 19/60; H04N 19/156; H04N 19/14; H04N 19/157; H04N 19/625; H04N 19/17; H04N 19/196
See application file for complete search history.

(56) References Cited

U.S. PATENT DOCUMENTS

| | | |
|---|---|---|
| 2015/0189274 A1 | 7/2015 | Oh et al. |
| 2015/0189275 A1 | 7/2015 | Oh et al. |
| 2015/0195530 A1 | 7/2015 | Oh et al. |
| 2017/0041603 A1 | 2/2017 | Oh et al. |
| 2017/0272757 A1 | 9/2017 | Xu |
| 2018/0098086 A1 | 4/2018 | Chuang et al. |
| 2018/0288412 A1 | 10/2018 | Oh et al. |
| 2018/0343469 A1* | 11/2018 | Jin .................. H04N 19/59 |
| 2019/0116381 A1 | 4/2019 | Lee et al. |

FOREIGN PATENT DOCUMENTS

| | | |
|---|---|---|
| RU | 2 628 153 C1 | 8/2017 |
| RU | 2 629 437 C2 | 8/2017 |
| WO | WO 2013/064099 A1 | 5/2013 |
| WO | WO 2016/066093 A1 | 5/2016 |
| WO | WO 2017/090993 A1 | 6/2017 |
| WO | WO 2017/176030 A1 | 10/2017 |
| WO | WO 2017/205701 A1 | 11/2017 |

OTHER PUBLICATIONS

Bross, B. et al., "High Efficiency Video Coding (HEVC) text specification draft 6," Editor, Joint Collaborative Team on Video Coding (JCT-VC) of ITU-T SG16 WP3 and ISO/IEC JTC1/SC29/WG11, Nov. 2011, 225 total pages.

* cited by examiner

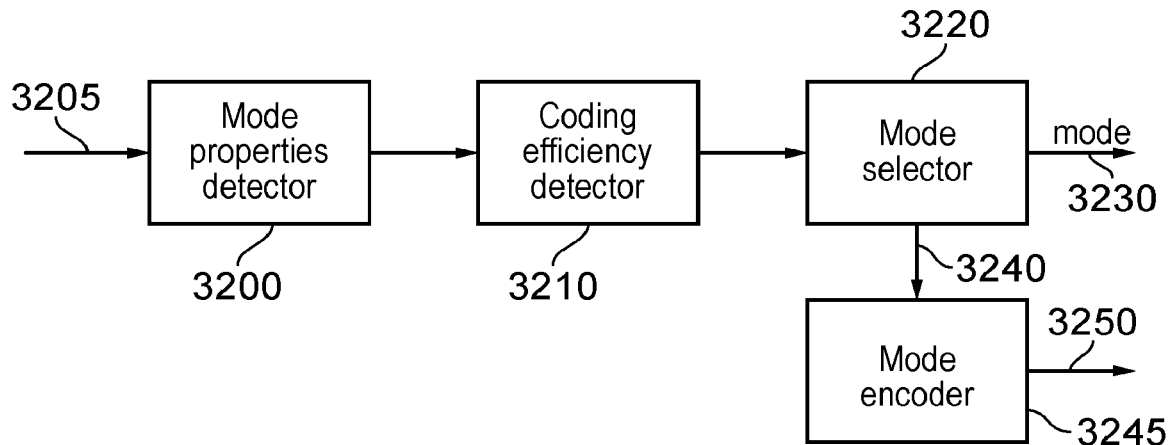
FIG. 31
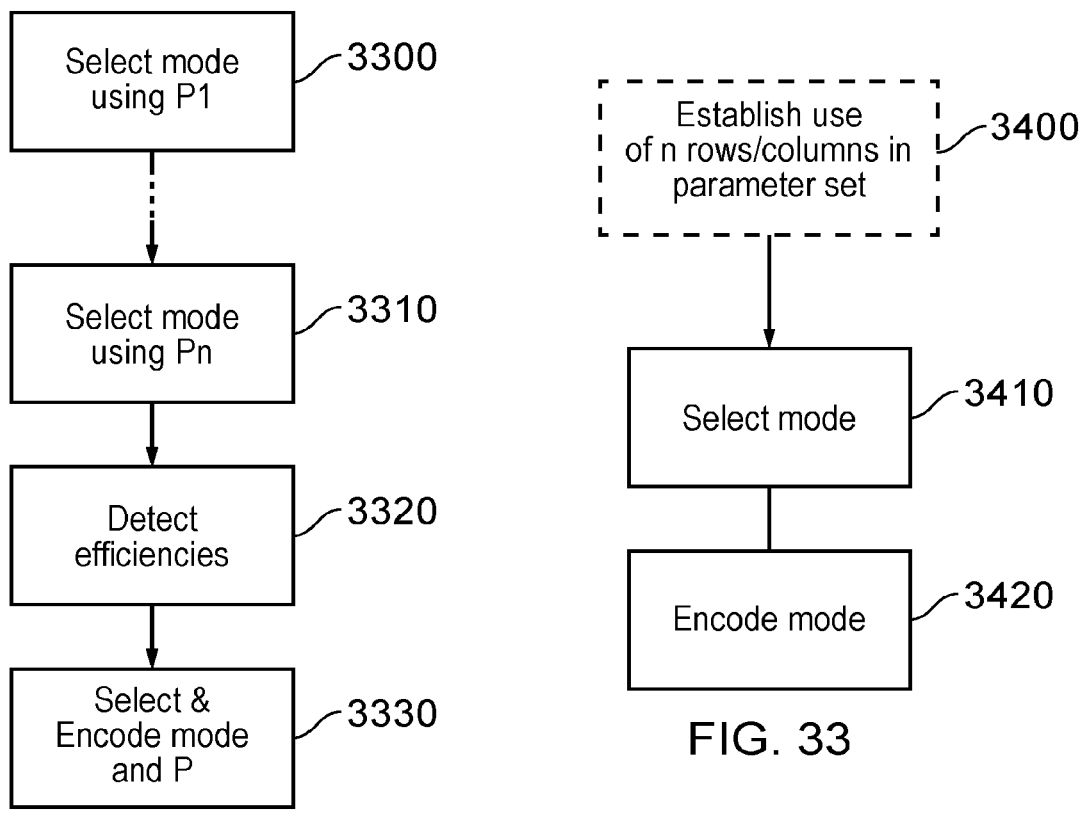
FIG. 32
FIG. 33

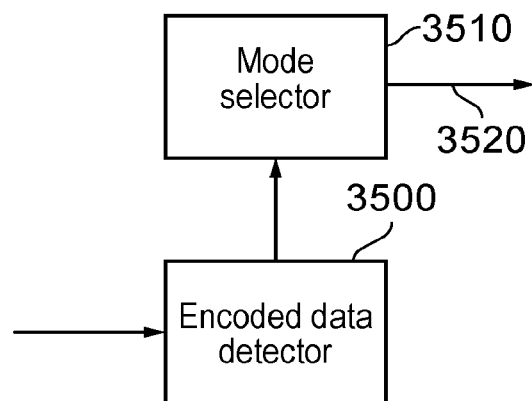
FIG. 34
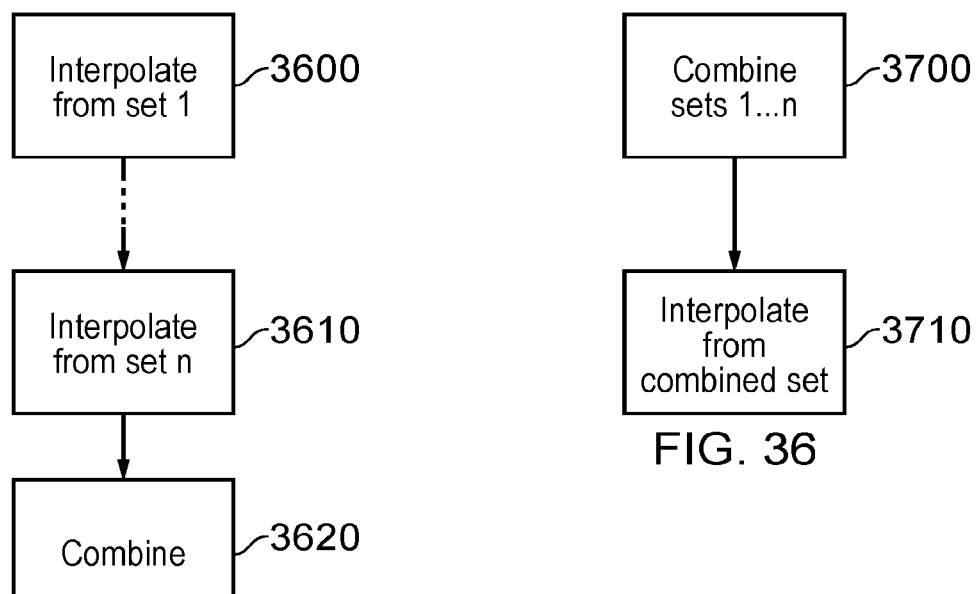
FIG. 35
FIG. 36

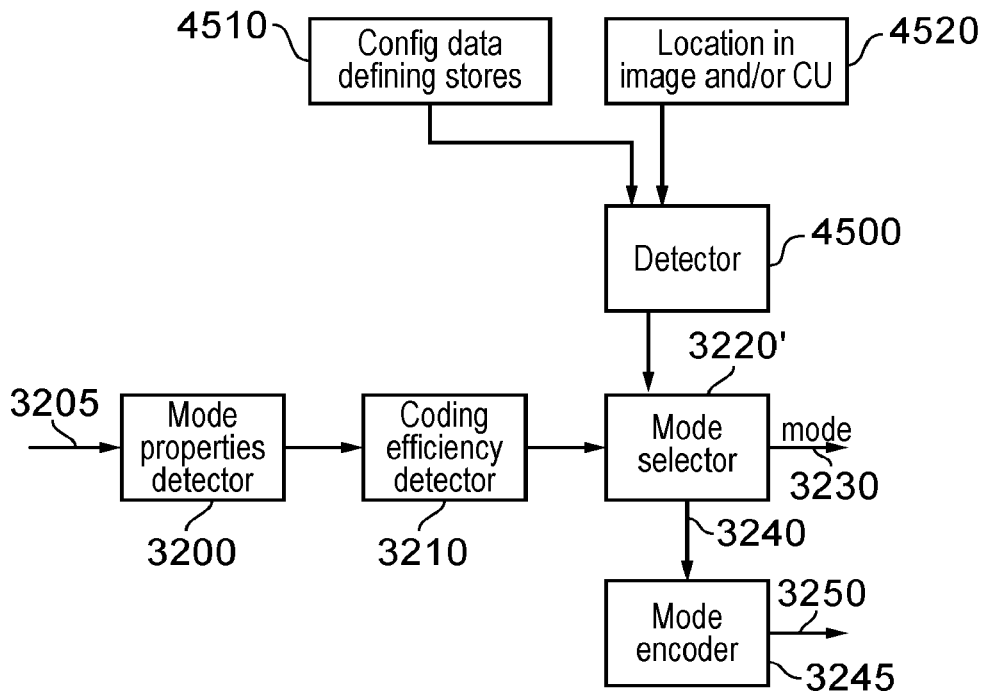
FIG. 45
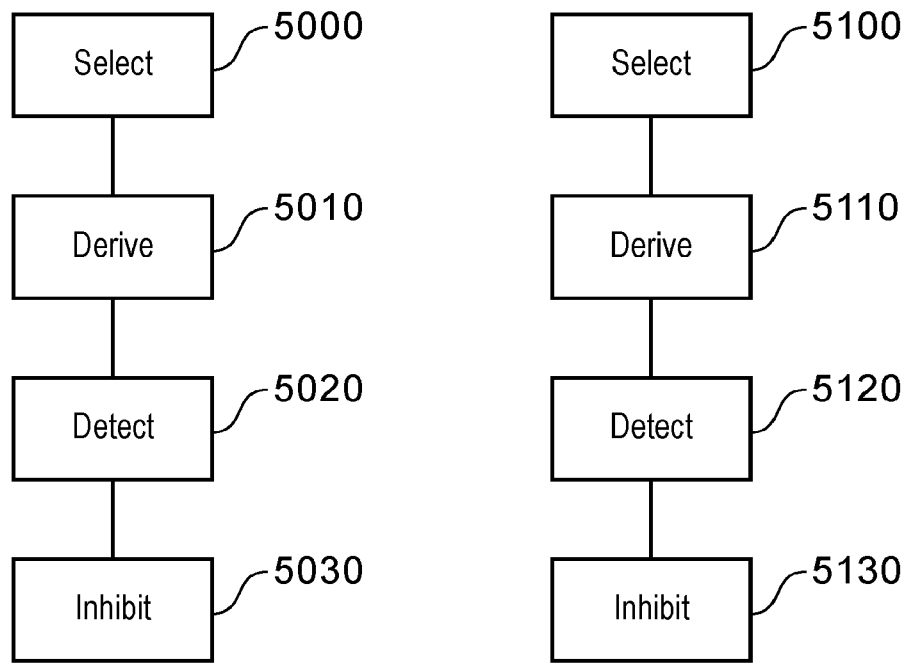
FIG. 50
FIG. 51

IMAGE DATA ENCODING AND DECODING

REFERENCE TO EARLIER APPLICATIONS

This application is a continuation of U.S. application Ser. No. 17/390,283, filed Jul. 30, 2021, which is a continuation of U.S. application Ser. No. 16/753,139, filed Apr. 2, 2020 (U.S. Pat. No. 11,159,803), which is a National Stage of Application No. PCT/GB2018/053077, filed Oct. 24, 2018, and claims priority from GB1717684.3 filed on 27 Oct. 2017 and GB1809024.1 filed on Jun. 1, 2018. The contents of each of which are hereby incorporated by reference.

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Current video codecs (coder-decoders) such as those used in H.264/MPEG-4 Advanced Video Coding (AVC) achieve data compression primarily by only encoding the differences between successive video frames. These codecs use a regular array of so-called macroblocks, each of which is used as a region of comparison with a corresponding macroblock in a previous video frame, and the image region within the macroblock is then encoded according to the degree of motion found between the corresponding current and previous macroblocks in the video sequence, or between neighbouring macroblocks within a single frame of the video sequence.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

SUMMARY

The present disclosure addresses or mitigates problems arising from this processing. Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 31 schematically represents an intra mode selector;

FIGS. 32 and 33 are respective schematic flowcharts representing methods of operation of the intra mode selector of FIG. 31;

FIG. 34 schematically represents an intra mode selector;

FIGS. 35 and 36 are respective schematic flowcharts representing methods of operation of an intra predictor;

FIG. 45 schematically represents an intra mode selector;

FIGS. 50 and 51 are schematic flowcharts illustrating respective methods.

DESCRIPTION OF THE PREFERRED EMBODIMENTS

Figure 1:
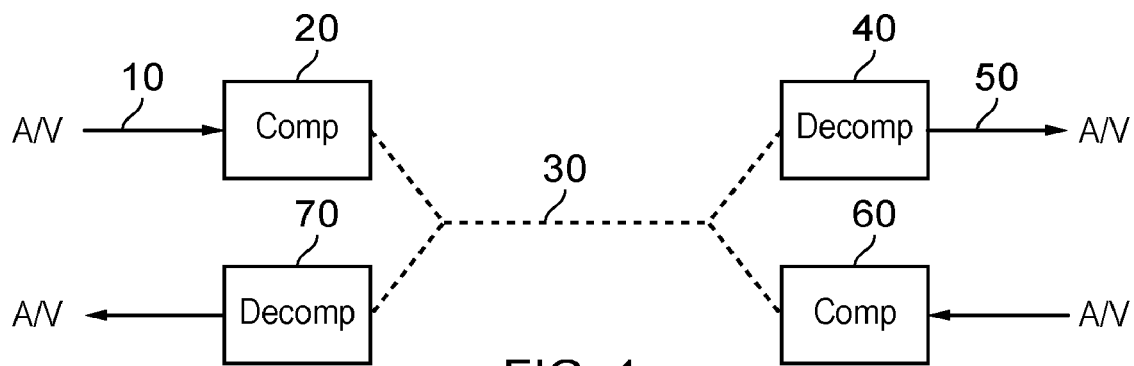
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
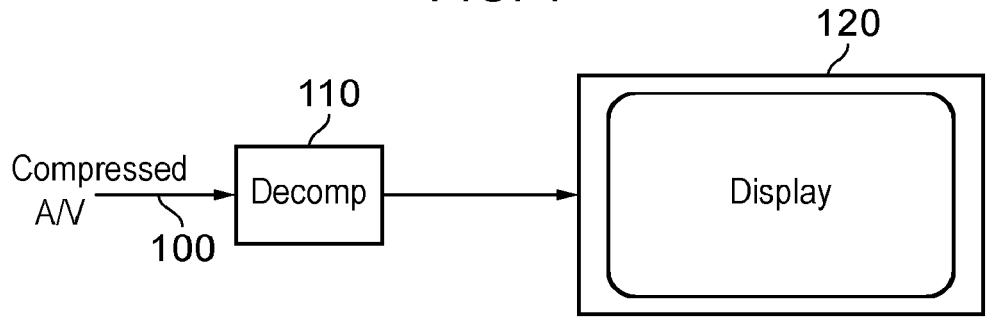
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
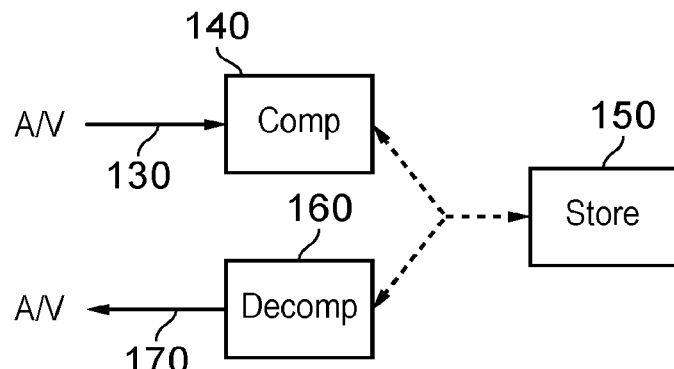
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
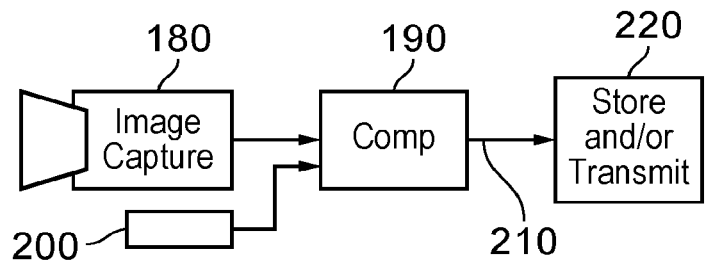
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
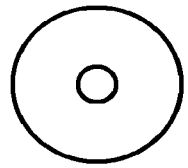
FIGS. 5 and 6 schematically illustrate storage media.
Figure 6:

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
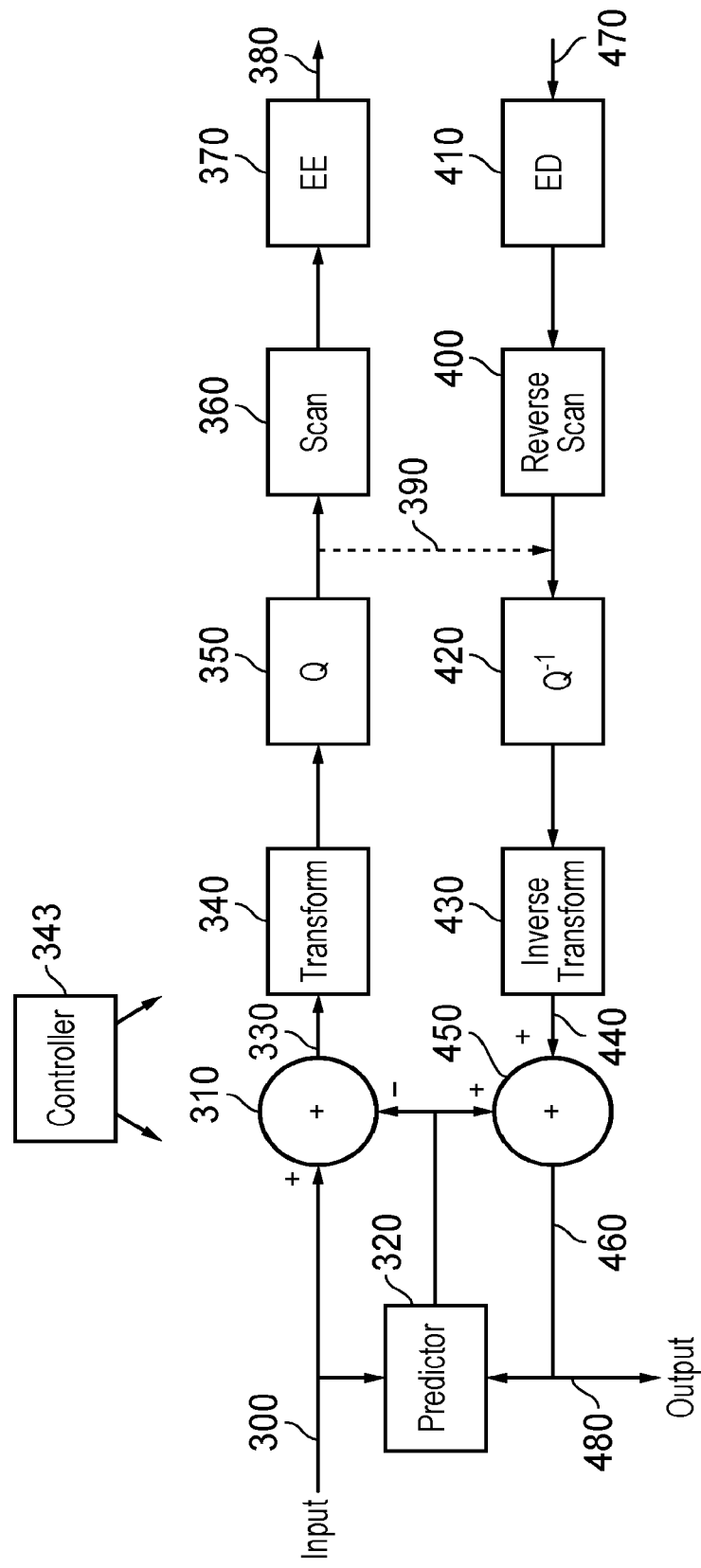
FIG. 7 provides a schematic overview of a video data compression and decompression apparatus.

FIG. 7 provides a schematic overview of a video data compression and decompression apparatus.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
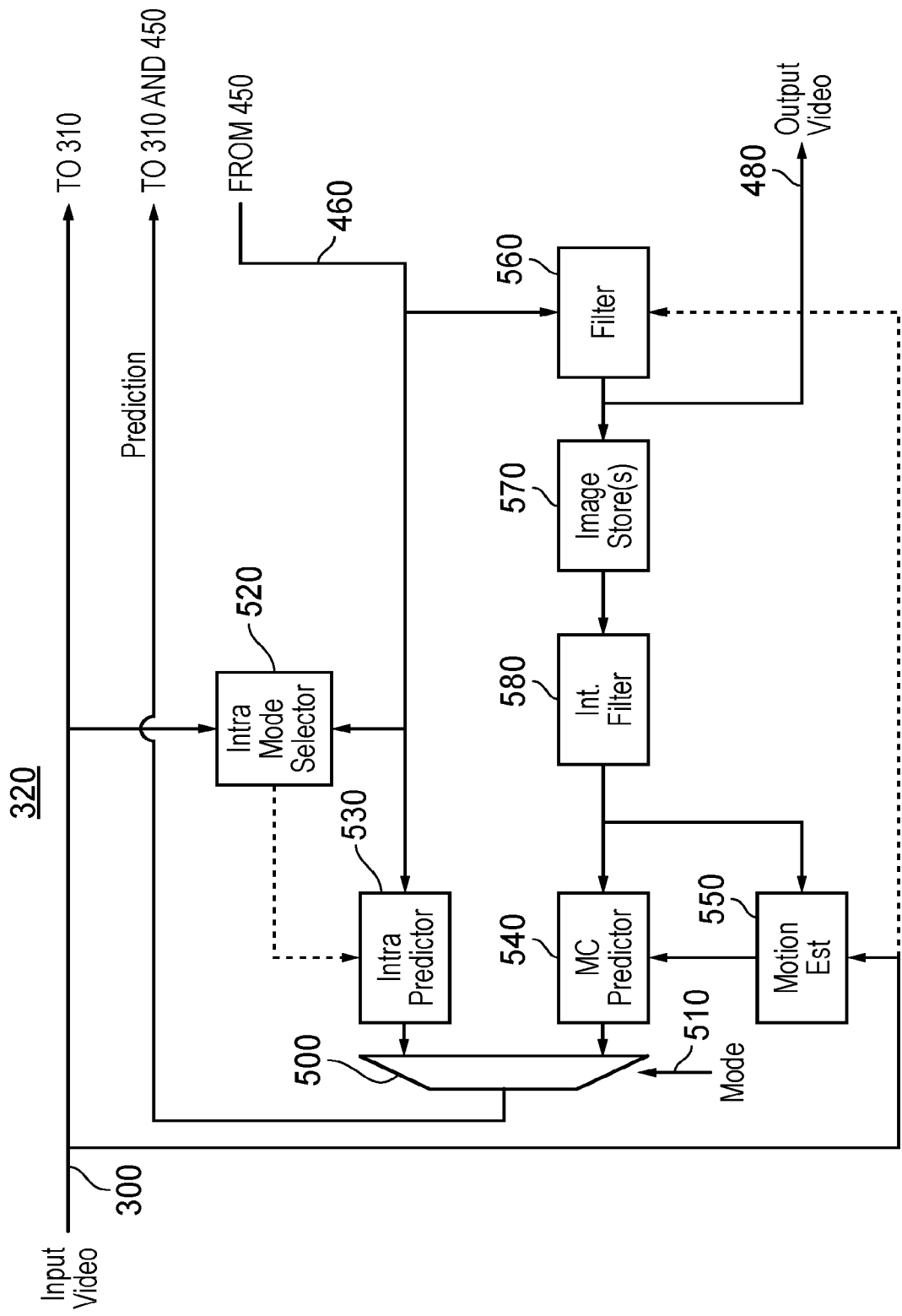
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in Bross et al: "High Efficiency Video Coding (HEVC) text specification draft 6", JCTVC-H1003_d0 (November 2011), the contents of which are incorporated herein by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are unavailable for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
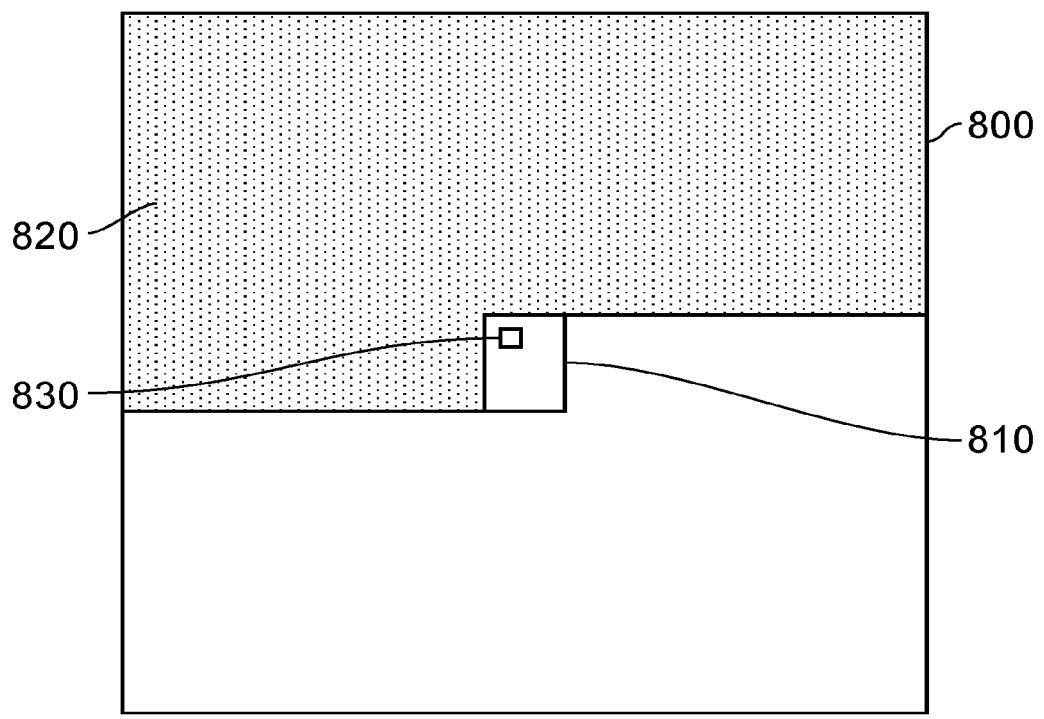
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples such as HEVC the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of the same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary.

For example, intra-prediction is not carried out across slice boundaries; slice boundaries are treated as image boundaries for this purpose.

Figure 10:
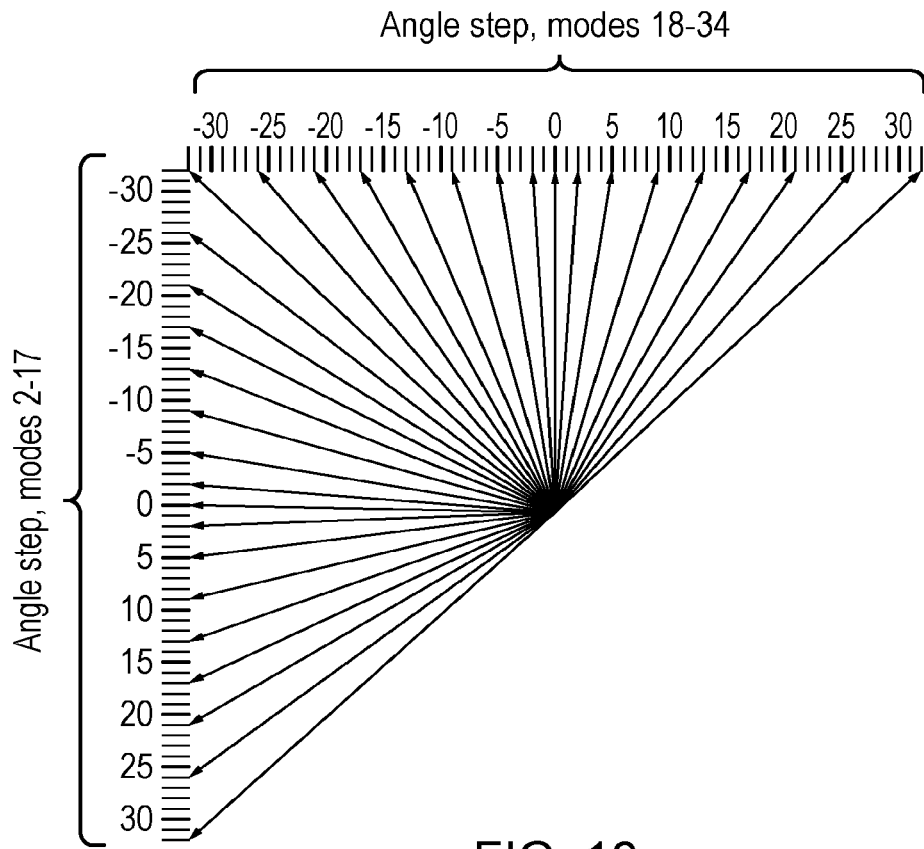
FIG. 10 schematically illustrates a set of possible intra-prediction directions.
Figure 11:
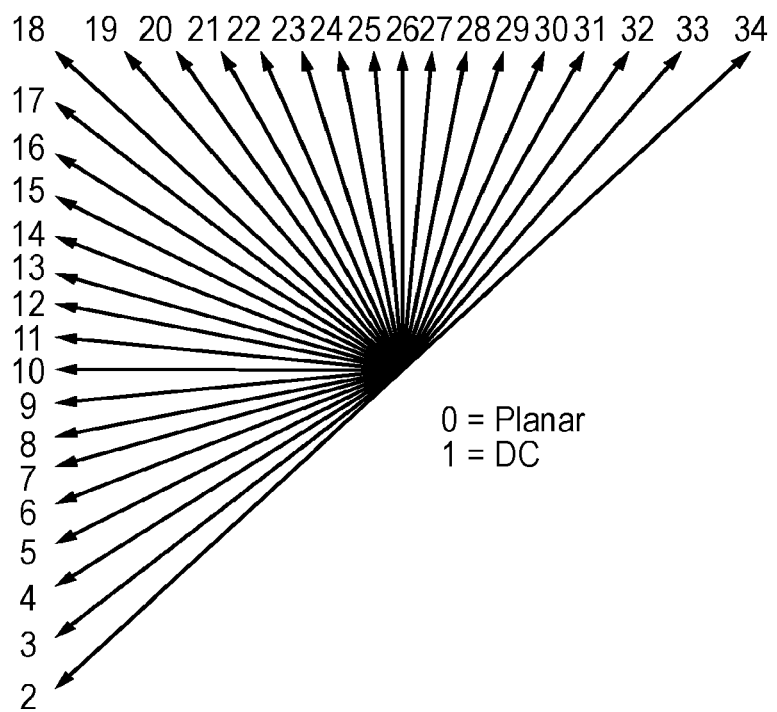
FIG. 11 schematically illustrates a set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) as shown schematically in FIG. 12 makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image (and the image decoder is configured to detect such data).

Figure 13:
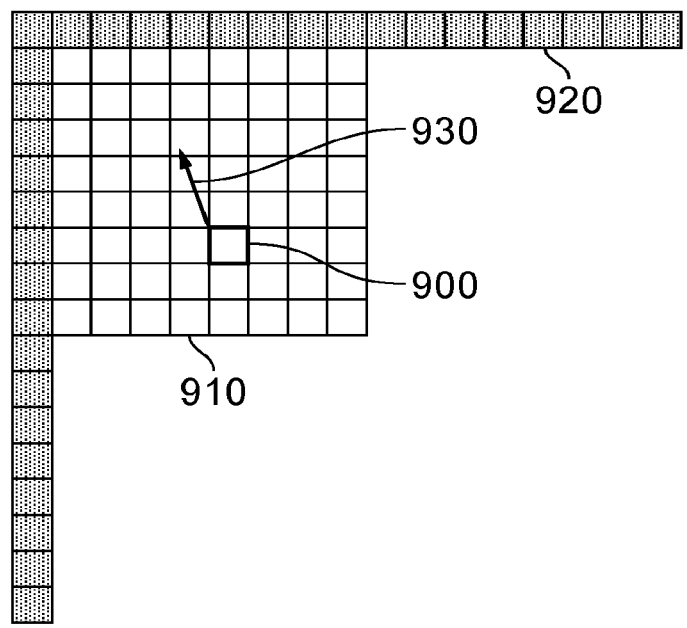
FIG. 13 schematically illustrates an intra-prediction process.

FIG. 13 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 13 or could be another shape such as rectangular.

Figures 14, 15:
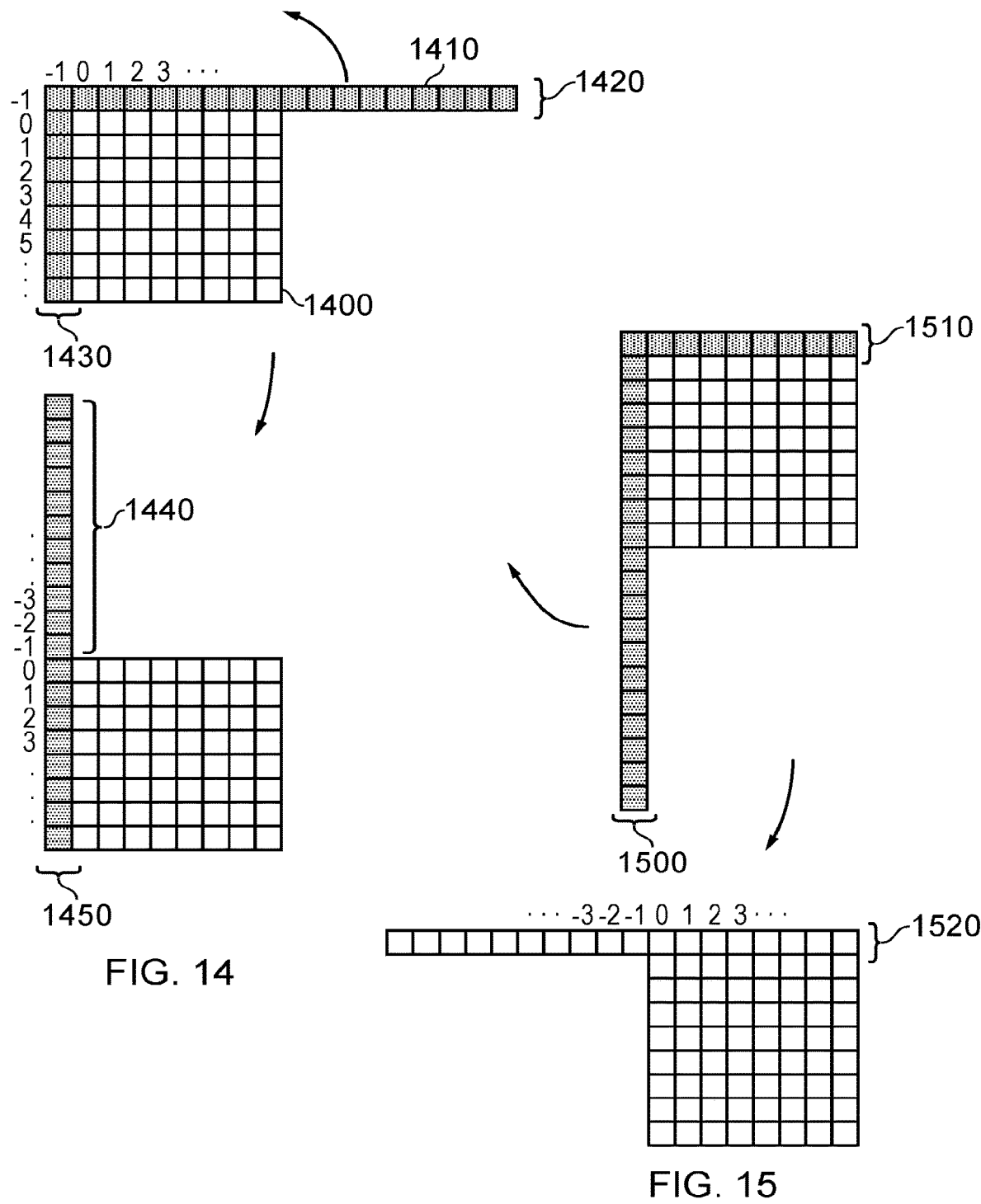
FIGS. 14 and 15 schematically illustrate a reference sample projection process.

FIGS. 14 and 15 schematically illustrate a previously proposed reference sample projection process.

In FIGS. 14 and 15, a block or region 1400 of samples to be predicted is surrounded by linear arrays of reference samples from which the intra prediction of the predicted samples takes place. The reference samples 1410 are shown as shaded blocks in FIGS. 14 and 15, and the samples to be predicted are shown as unshaded blocks. Note that an 8×8 block or region of samples to be predicted is used in this example, but the techniques are applicable to variable block sizes and indeed block shapes.

As mentioned, the reference samples comprise at least two linear arrays in respective orientations with respect to the current image region of samples to be predicted. For example, the linear arrays may be an array or row 1420 of samples above the block of samples to be predicted and an array or column 1430 of samples to the left of the block of samples to be predicted.

Figure 12:
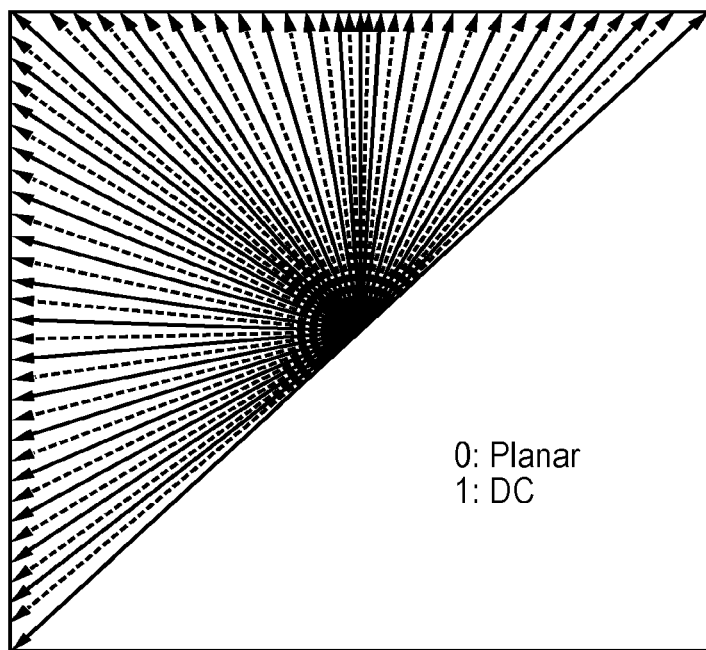
FIG. 12 schematically illustrates another set of prediction modes.

As discussed above with reference to FIG. 13, the reference sample arrays can extend beyond the extent of the block to be predicted, in order to provide for prediction modes or directions within the range indicated in FIGS. 10-12. Where necessary, if previously decoded samples are not available for use as reference samples at particular reference sample positions, other reference samples can be re-used at those missing positions. Reference sample filtering processes can be used on the reference samples.

A sample projection process is used to project at least some of the reference samples to different respective positions with respect to the current image region, in the manner shown in FIGS. 14 and 15. In other words, in embodiments, the projection process and circuitry operates to represent at least some of the reference samples at different spatial positions relative to the current image region, for example as shown in FIGS. 14 and 15. Thus at least some reference samples may be moved (for the purposes at least of defining an array of reference samples from which samples are predicted) with respect to their relative positions to the current image region. In particular, FIG. 14 relates to a projection process performed for modes which are generally to the left of the diagonal mode (18 in FIG. 11) mainly modes 2 . . . 17, and FIG. 15 schematically illustrates a reference sample projection carried for modes 19 . . . 34, namely those generally above the block to be predicted (to the right of the diagonal mode 18). The diagonal mode 18 can be assigned to either of these two groups as an arbitrary selection, such as to the group of modes to the right of the diagonal. So, in FIG. 14, when the current prediction mode is between modes 2 and 17 (or their equivalent in a system such as that of FIG. 12 having a different number of possible prediction modes), the sample array 1420 above the current block is projected to form additional reference samples 1440 in the left hand column. Prediction then takes place with respect to the linear projected array 1450 formed of the original left hand column 1430 and the projected samples 1440. In FIG. 15, for modes between 18 and 34 of FIG. 11 (or their equivalent in other sets of prediction modes such as those shown in FIG. 12), the reference samples 1500 in the left hand column are projected so as to extend to the left of the reference samples 1510 above the current block. This forms a projected array 1520.

One reason why projection of this nature is carried out is to reduce the complexity of the intra prediction process, in that all of the samples to be predicted are then referencing a single linear array of reference samples, rather than referencing two orthogonal linear arrays.

Figure 16:
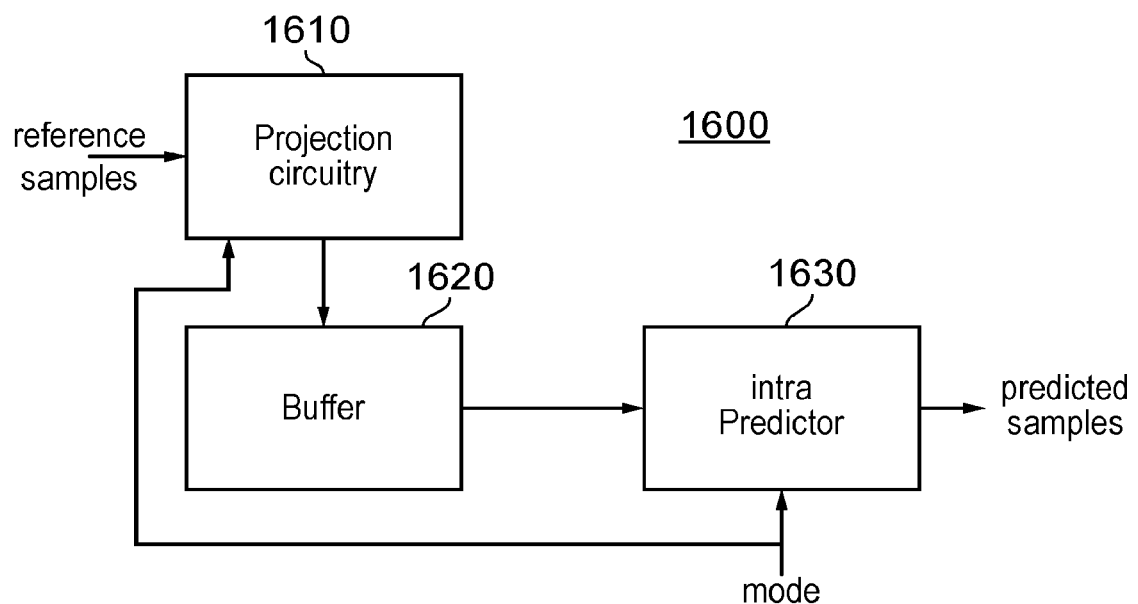
FIG. 16 schematically illustrates a predictor.

FIG. 16 schematically illustrates a previously proposed prediction circuitry 600 arranged to carry out the projection process of FIGS. 14 and 15, specifically by providing projection circuitry 1610 configured to carry out a projection process on the reference samples currently selected for a block of region to be predicted. The projected reference samples are stored in a buffer 1620 to be accessed by an intra predictor 1630 to generate predicted samples from the projected reference samples. The projection process is carried out according to the prediction mode associated with the current block to be predicted, using the techniques discussed in connection with FIGS. 14 and 15.

In embodiments, the same projection process is carried out in the decoder and in the encoder, so that the predicted samples are the same in each instance. Possible variations in operation between the use of prediction modes which will be referred to as "straight modes" and prediction modes which will be referred to as "curved modes" will now be discussed.

Figure 17:
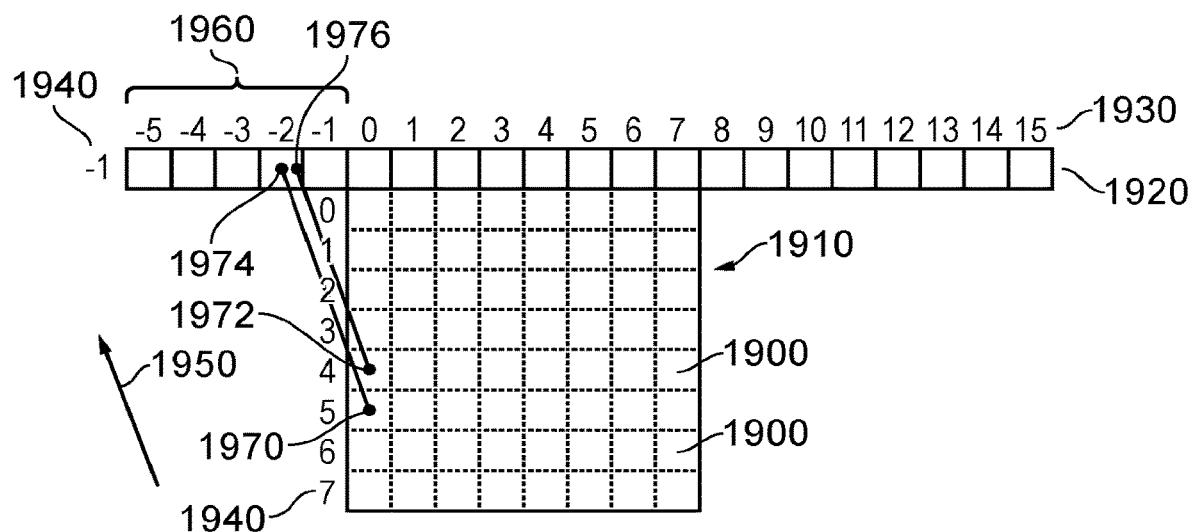
FIGS. 17 and 18 schematically illustrate the use of projected reference samples.
Figure 18:
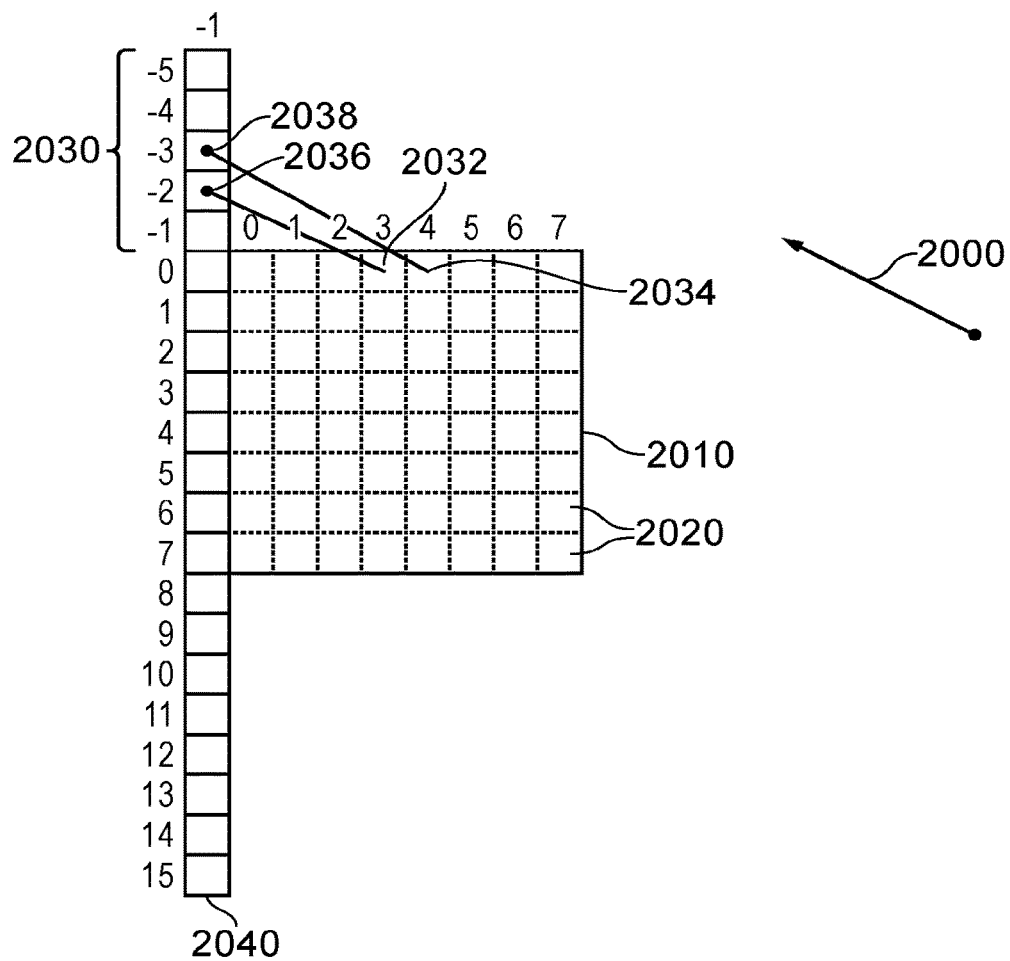

As further background, FIGS. 17 and 18 schematically illustrate an example technique by which samples 1900 of a current region 1910 or block to be predicted, are predicted from reference samples 1920. In this example, the reference samples have been projected into a linear array using the techniques described with reference to FIGS. 14-16 above.

A system of (x, y) coordinates is used for convenience, to allow individual reference or predicted sample positions to be identified. In the example of FIG. 17, x coordinates are shown by a row 1930 of numbers, and y coordinates are shown by a column 1940 of numbers. So, each reference or predicted sample position has an associated (x, y) designation using the coordinate system.

In the example of FIG. 17, a generally vertical mode (for example, a mode which is more vertical than horizontal) 1950, such as mode 23 in the designation of FIG. 11, noting that a different mode number could be used if the set of modes shown in FIG. 12 were employed, has been selected for prediction of samples 1900 of the block or region 1910. As discussed above with reference to FIGS. 14-16, such a generally vertical prediction mode is handled by the circuitry of FIG. 16 by projecting the left column of reference samples into an extension 1960 of the reference samples above the block or region 1910.

Each of the samples to be predicted 1900 is predicted as follows. For each sample to be predicted, there is an associated (x, y) location such as a location (0, 5) for a sample 1970 or a location (0, 4) for a sample 1972. These two samples are used purely by way of example and the same technique applies to each of the samples 1900 to be predicted.

The sample positions of the samples 1970, 1972 to be predicted are mapped according to the direction 1950 associated with the current prediction mode to respective locations or reference positions 1974, 1976 among the reference samples. This mapping may be carried out using an expression such as that shown below, noting that this is a linear expression with respect to the coordinate system (x, y):

For horizontal modes 2-17 in the notation of FIG. 11:
predicted value (x. y)={1−f(p)}×ref [y+i(p)]+f(p)×ref [y+i(p)+1]
with p=A×(x+1)

For vertical modes 18-34 in the notation of FIG. 11:
predicted value (x. y)={1−f(p)}×ref [x+i(p)]+f(p)×ref [x+i(p)+1]
with p=A×(y+1)

and where i(p)=floor(p), is the value p rounded down (towards negative infinity) to the nearest integer, f(p)=p−i(p) represents the fractional part of the value p.

A is an angle parameter indicating the angle of the current mode. To illustrate, for example, for a horizontal or vertical line, A would be 0; for a 45° diagonal line, A would be ±1.

Those skilled in the art would appreciate that integer approximations can be used to simplify the linear equations, for example, representing the angle parameter A as a fractional fixed-precision number. In HEVC, the angles have an accuracy of 5 fractional bits.

So, for example, each sample to be predicted is associated with a coordinate position within the current region; and the intra-image predictor is configured to detect the reference position for a given sample to be predicted as a function of the coordinate position of the given sample to be predicted, the function depending upon the selected prediction mode.

In example arrangements, the reference position 1974, 1976 is detected to an accuracy or resolution of less than one sample, which is to say with reference to the reference sample locations (−5, −1) . . . (15, −1), a fractional value is used for the x coordinate of the reference position within the projected set of reference samples 1920. For example, the reference position could be detected to a resolution of 1/32 of a sample separation, so that the x coordinate of the reference positions 1974, 1976 is identified to that resolution. The y coordinate of the reference position is −1 in each case, but this is in fact irrelevant to the calculations that then take place, which relate to interpolation along the x axis of the reference samples 1920.

The prediction of the predicted values 1970, 1972 is an interpolation of the value applicable to the detected x coordinate of the reference sample position 1974, 1976, for example as described above in the formulae shown earlier.

A similar arrangement is shown schematically in FIG. 18, except that a generally horizontal prediction mode, for example a prediction mode which is more horizontal than vertical, such as (for example) mode 14 of the set shown in FIG. 11 (or a corresponding number for a similar mode in the set shown in FIG. 12) having a prediction direction 2000 is used. The selection of the particular prediction mode applies to the whole of the block or region 2010 of samples 2020 to be predicted and the particular example here is chosen purely for the purposes of the present explanation.

In the case of a generally horizontal mode, as discussed above, the projection circuitry shown in FIG. 16 projects those reference samples from above the block or region 2010 to form an extension 2030 of reference samples to the left of the region. Once again, the derivation of two example samples to be predicted, samples 2032, 2034, is shown, such that the sample position 2032, 2034 are mapped using the direction 2000 into reference positions 2036, 2038 amongst the set of reference samples 2040. Once again, a similar (x, y) coordinate system is used and the reference positions 2036, 2038 are expressed to a 1/32 sample resolution in the y-direction. The x coordinate of the reference sample positions is −1 but this is irrelevant to the process which follows. The sample values of the samples to be predicted are obtained in the manner described above.

In these arrangements, the intra predictor 530 provides an example of a detector configured to detect the reference position as an array position, with respect to an array of the reference samples, pointed to by the prediction direction applicable to the current sample to be predicted; and a filter configured to generate the predicted sample by interpolation of the array of reference samples at the detected array position. The detector may be configured to detect the array position to an accuracy of less than one sample such as 1/32 sample.

The intra mode selector 520 the selector may be configured to perform at least a partial encoding to select the prediction mode.

Figure 19:
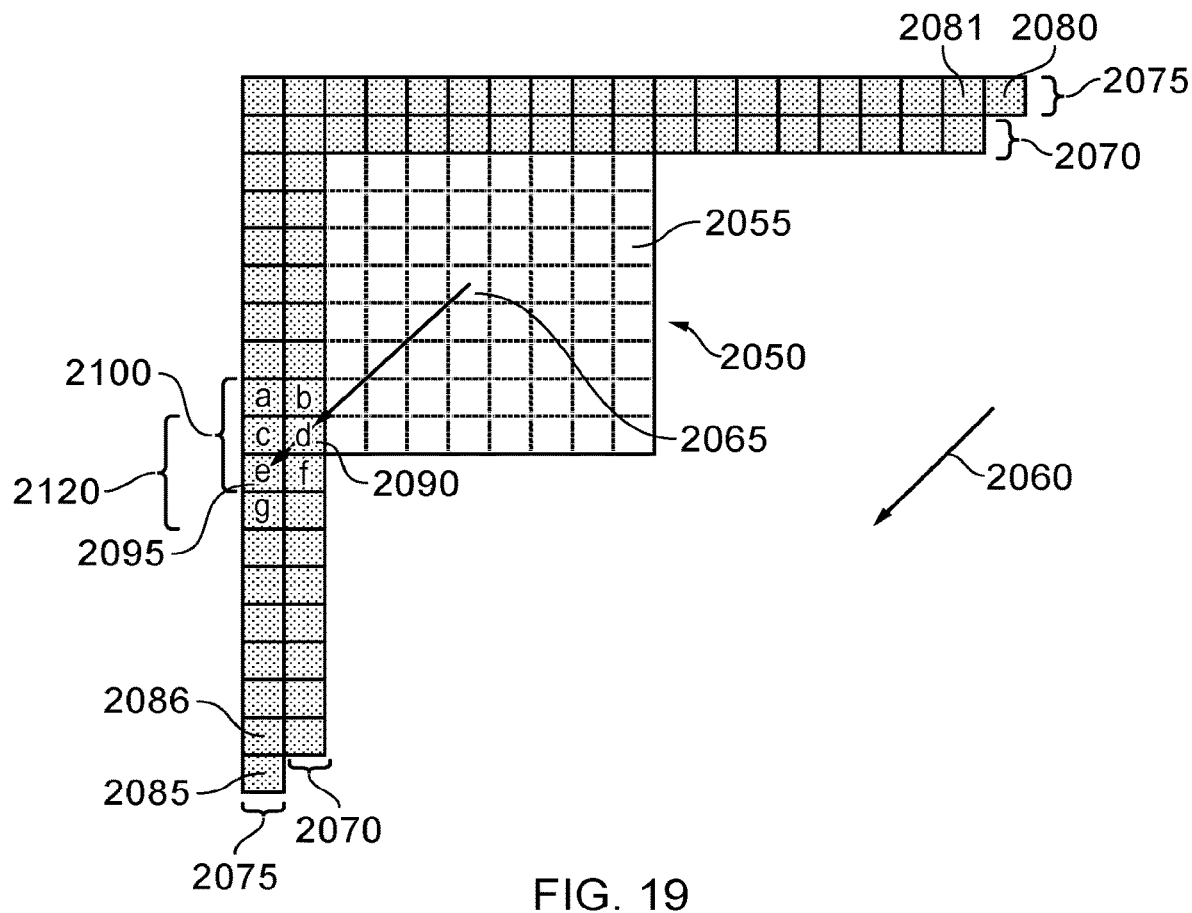
FIG. 19 schematically illustrates a prediction process.

FIG. 19 schematically illustrates a prediction process.

In the arrangements of FIGS. 17 and 18, for example, the reference samples 1920, 2440 comprised a single row and column of samples around the current region or block to be predicted. In FIGS. 17 and 18, this single row and single column were projected to form either an elongate single row in FIG. 17 or an elongate single column in FIG. 18. But the origin of the reference sample in both cases was a single row and column to the left of and above the current region.

Further possibilities will now be discussed in which, in at least some example circumstances, multiple rows and/or multiple columns of reference samples are used.

FIG. 19 schematically illustrates a situation relating to an 8×8 block 2050 of reference samples 2055. The example used here is of an 8×8 block, but it will be appreciated that the present techniques can apply to various sizes and indeed shapes of blocks. So, the present techniques could apply to other sizes such as 4×4, 16×16, 32×32, 64×64 blocks or the like, or to non-square blocks such as (purely by way of example) 8×16 or the like. So, references to the 8×8 blocks are purely for the purposes of illustrative discussion.

In FIG. 19, two rows of reference samples are used above the block or region 2050 and two columns of reference samples are used to the left of the block or region 2050. Purely by way of example, a prediction direction 2060 is assumed to have been selected for the block 2050. This could correspond, for example, to the mode 2 in the notation of FIG. 11 or a corresponding mode in the notation of FIG. 12. The interpolation or prediction of a particular example predicted sample 2065 will be discussed, but similar techniques apply to each of the samples 2055 to be predicted in the block or region 2050.

Discussing first the reference samples, it will be seen that the reference samples in use in FIG. 19 comprise a row and column 2070 spatially nearest to the block 2050, along with a further row or column 2075 next-adjacent to the row and column 2070. It can also be seen that the row and column 2075 extends further (to reference samples 2080, 2085) than the row and column 2070, in order to allow for prediction over the range of angles corresponding to the prediction modes 2 . . . 34 in FIG. 11 or the equivalent in FIG. 12 to be used. The reference samples 2080, 2085 can simply be drawn from previously decoded reference samples in the normal way. If they are unavailable (because they have not yet been decoded) then next-adjacent samples 2081, 2086 can be repeated to form the samples 2080, 2085 respectively, or alternatively an extrapolation process can be used as discussed below.

Turning to the interpolation of the sample 2065, it can be seen that applying the direction 2060 defined by the current prediction mode points to a reference position 2090 in the first row and column 2070 of reference samples. Extending the prediction direction points to a further position 2095 in the second row and column 2075. The reference samples around these two reference positions have been annotated as reference samples a . . . g for clarity of the following explanation. It is also assumed, by way of example, that a 3-tap interpolation process such as the process discussed above is used to derive a predicted sample. Of course, other interpolation techniques could be used and the following discussion would simply be adapted accordingly.

Figure 20:
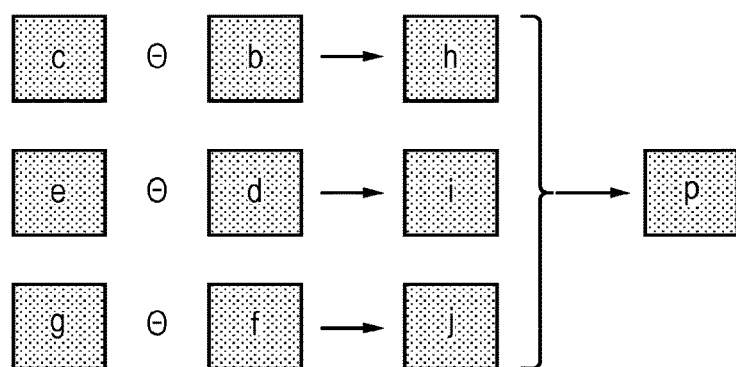
FIGS. 20 to 22 schematically illustrate example interpolation techniques.
Figure 21:
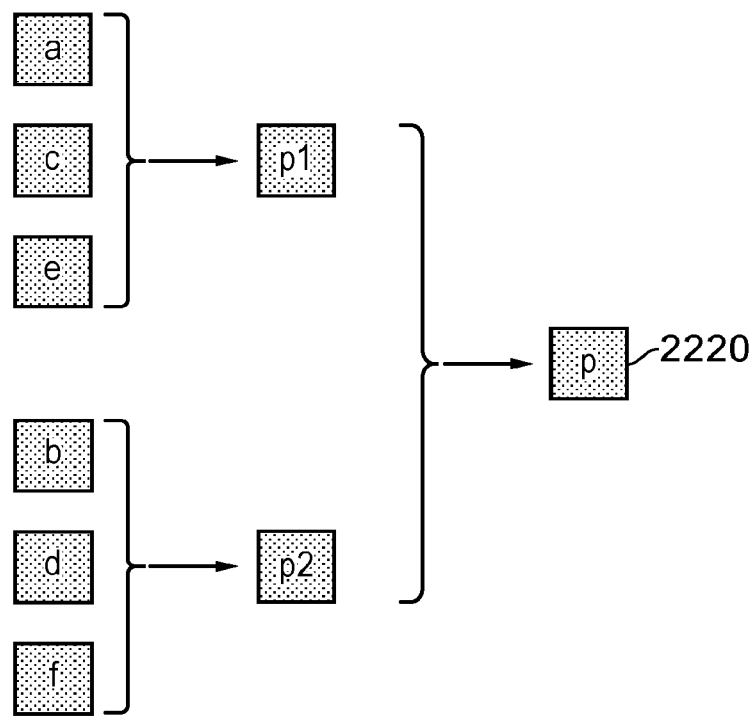
Figure 22:
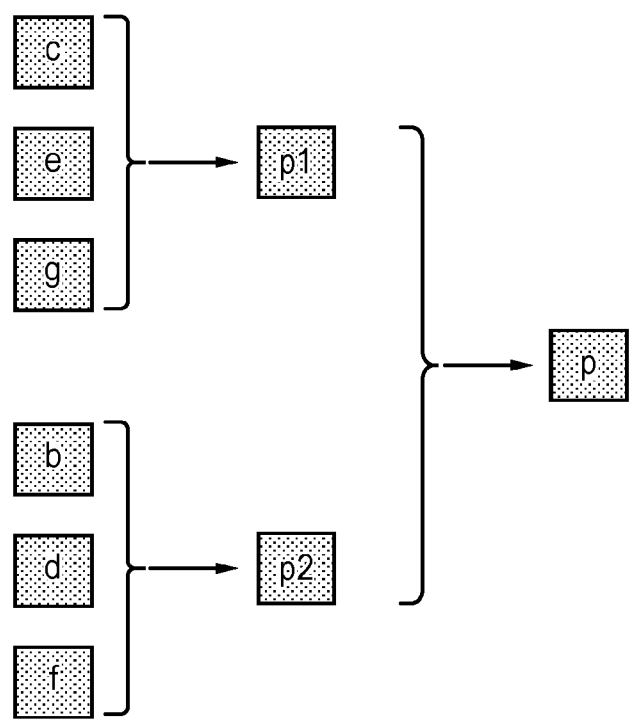

FIGS. 20-22 relate to various possible techniques which can be applied by the intra predictor 530 for making use of two rows and columns of reference samples in the form shown in FIG. 19.

Considering first, FIG. 20, the reference position 2090 is taken into account and the three samples in the row and column 2070 (namely the reference samples b, d, f) and the reference samples in the row and column 2075 (namely the reference samples c, e, g), which is to say the reference samples within a range 2120 pointed to by the prediction direction in use, are combined. So in this example, pairs of reference samples, one from each of the rows/columns 2070, 2075, are combined in respective groups and the resulting combined reference samples are then used in an interpolation process. The selection of the reference samples to be combined is based upon the reference position 2090 in the row/column 2070 and separately on the reference position 2095 in the row/column 2075. This means that a range 2100 of reference samples in the row/column 2070 is used, and (according to the prediction direction in use) a different—or at least potentially different—range 2120 of reference samples (c, e, g) is used in dependence upon the reference position 2095 in the row/column 2075. The combination takes place between the pairs of reference samples, which is to say that reference samples c and b are combined to form a reference sample h; reference samples e and d are combined to form a reference sample i; and reference samples g and f are combined to form a reference sample j. The reference sample h, i and j are then processed by (in this example) a three-tap interpolation process to form a predicted sample p.

The combination applied to the pairs of reference samples (c, b), (e, d), (g, f) is shown by an arbitrary symbol "⊖" to indicate that various possibilities exist for the nature of this combination. This combination could be a simple arithmetic mean. In other examples, it could be a weighted mean, for example so as to apply a greater weight to the reference samples (b, d, f in this example) spatially closer to the block 2050 than the reference samples (c, e, g) spatially further away from the block 2050. For example, in the situation of FIG. 19 in which two rows and columns of reference samples are used, the weighting could be 0.6 for the closer reference samples and 0.4 for the further-away sample in each pair, so that (for example) h=0.4c+0.6b. In a situation such as one to be discussed below in which (for example) three or four rows and columns of reference samples are used, a weighting could be applied in a similar manner as follows (where Rn is a reference sample in row/column n, where n=1 for the row/column spatially closest to the block or region to be predicted):

Three rows/columns:
combined reference sample=0.5R1+0.3R2+0.2R3
Four rows/columns:
combined reference sample=0.5R1+0.25R2+0.15R3+0.1R4

Of course, other combinations, or indeed equal combinations, could be used.

So, in the example above. , a combination process such as an arithmetic mean or a weighted arithmetic mean is used to combine reference samples in the rows/columns 2070, 2075 and then the predicted sample generation process such as a three-tap interpolation process is used on the combined values.

As discussed below in connection with FIG. 36, this combination can be done "in advance" so that a first stage of operation of the intra predictor 530 can be to combine the multiple rows and columns of reference samples according to the currently selected prediction direction, so that that prediction sample generation process proceeds with respect to the combined values as though they were the reference samples themselves, providing an example in which in which the intra-image predictor is configured to combine the two or more parallel linear arrays of reference samples to form a linear array of reference samples.

Therefore, FIG. 20 provides an example in which the intra-image predictor is configured to combine two or more sets of reference samples (such as (a, c, e) and (b, d, f) in FIG. 20, or (c, e, g) and (b, d, f) in FIG. 20) to derive intermediate reference sample values (h, I, j), and to derive the predicted sample p from the intermediate reference sample values. In example arrangements, the intra-image predictor is configured to derive the predicted samples by interpolating amongst the intermediate reference samples. For example, each set of reference samples may comprises samples from a respective one or the two or more parallel arrays 2070, 2075 of reference samples. In the case of the use of the samples (c, e, g) in FIG. 20, based around the reference position 2095, this is an example in which each set of reference samples comprises a set, in the respective array of reference samples, pointed to by the prediction direction. In some examples, which the intra-image predictor is configured to combine the reference sample values according to a weighted combination, in which a weighting applied to a reference sample value decreases with increasing separation of the set of reference samples containing that reference sample value, from the current region or the current sample to be predicted. For example, the weighting of 0.6 can be used for the reference samples (b, d, f) from the array 2070, and the weighting 0.4 can be used for the reference samples (a, c, e) or (c, e, g) from the array 2075.

In alternative examples, rather than mixing c,b->h a weighted mix (interpolation) of two or more of {a,c,e,g} can be used such that the interpolated value is spatially aligned with b according to the prediction direction 2060. Then h can be a 50:50 or other weighted mix between b and interp(two or more of {a,c,e,g}).

Effectively this involves interpolating the whole column 2075 such that it is aligned with 2070 according to the direction 2060. The interpolated column can then be mixed (by 50:50, 25:75 or another weighting) with the column 2070.

During the interpolation process described above, since the projection of the column 2075 to be spatially aligned with samples of the column 2070 according to the current prediction direction will require interpolation, supersampling (so as to generate interpolated samples at a smaller spatial resolution than the original reference samples) could be used to reduce any negative impact of the interpolation process (since interpolation can in some situations soften data or reduces high frequency detail).

Another option is to use so-called non-uniform sampling, to combine the two columns into a supersampled data set. The phasing of the two regularly set of sampled values is determined by the angle of the currently selected prediction direction. To avoid effects of noise, the new reference samples may be low-pass filtered, either in a subsequent process, or as part of the supersampling process.

In another example method of operation, each row/column 2070, 2075 is used individually to generate an intermediate predicted sample value, and the intermediate predicted sample values are then combined.

Therefore these arrangements provide examples in which each set of reference samples comprises a set, in the respective array of reference samples, or of values interpolated from the respective array of reference samples, pointed to by the prediction direction.

Looking first at FIG. 21, this relates to the use of the range 2100 in each row/column being aligned only with the reference position 2090 in the row/column 2070, so that the reference samples a, c and e are combined (for example, by the three-tap interpolation process) to produce a first intermediate predicted sample p1. The reference samples b, d and f in the row/column 2070 are combined by a similar process to produce a second intermediate predicted value p2. The values p1 and p2 can then be combined, for example, by an arithmetic mean or a weighted mean (for example, as discussed above, placing a greater weight such as 0.6 on the intermediate predicted sample value p2 and a reduced weight such as 0.4 on the intermediate predicted sample value p1, given that it is generated from reference samples further away from the block 2050) to generate the final predicted sample value p 2200.

A similar arrangement is shown in FIG. 22, but making use of the range of reference samples 2100 in the row/column 2070 and the range 2120 in the row/column 2075, which is to say that reference samples in the row/column 2075 around the reference position 2095 in that row/column are used.

So, the first intermediate predicted sample value p1 is generated from the reference samples c, e and g and the second intermediate predicted sample value p2 is generated from the reference samples b, d and f. As before, these can be combined by any of the processes discussed above to form the final predicted sample value p.

The examples discussed with reference to FIGS. 20-23 relate to a pair of rows/column 2070, 2075. If more than two rows/columns are use, then either the processes discussed above could be applied individually. So, in the case of FIG. 20, for n rows/columns, where n is at least two, all of the reference samples within respective ranges 2100, 2120 and the like of each individual row/column are combined to form a set of three intermediate reference samples h, i, j which are then combined. In the case of FIGS. 21 and 22, for n rows/columns, where n is at least two, n intermediate predicted sample values are generated and are then combined, for example using a weighted combination.

In example arrangements, the controller 343 can vary the weighting according to one or more properties or parameters of the current interpolation process. For example, such a parameter may be the block size of the current block to be interpolated. The weighting could be detected by the controller 343 from a predetermined or programmable (for example via parameter sets communicated as part of the compressed data stream) set of weight values, or derived using a predetermined or programmable function. An example of such a relationship (whether defined by a look-up or a function) is:

block size up to a threshold block size (such as a threshold of 4×4, 8×8 or (in the case of non-square blocks) one dimension being up to 8 samples): weighting is 25:75 (25% for the further row/column of reference samples or interpolated samples derived from them and 75% for the closer row/column); or block size greater than the threshold block size: weighting is 50:50

In other examples, the (or a) parameter may represent a spatial separation, in sample rows or columns or along the prediction direction, of the current sample to be interpolated from the nearest row/column of reference samples. In the example of FIG. 19, the sample position 2065 is in the fourth column of samples to be interpolated, starting at the reference column 2070. A mapping can be used between weightings and column separation (or row separation in the case of a generally vertical prediction direction, such as:

m=weighting applied to nearer column/row of reference samples or to interpolated samples derived from them;

n=weighting applied to farther column/row of reference samples, or to interpolated samples derived from them;

s=separation of current sample position from nearest reference in columns/rows bs=block size in that dimension (in columns or rows, whichever is used to define s)

For example:

m:n=s: (s+1)

Or:

m=0.25+(0.25*s/bs); n=(1−m)

The weighting used can be generated by applying two or more of these functions as discussed, for example with m,n being respective products of a weighting m,n derived by block size and a weighting m,n derived by sample position.

In other words, the influence or contribution of a non-adjacent row or column of reference samples increases as the separation of the sample position to be predicted from that row/column increases. For example, for samples to be predicted which are adjacent to the nearest row/column of reference samples, the influence of another (further away) row/column of reference samples may be expected to be lower than if the sample to be predicted is a long way (say, 8 pixels or more) from the row/column of reference samples adjacent to the current block, then the influence of the non-adjacent (such as next) row/column of reference samples may be expected to be larger.

Therefore, in examples, the intra-image predictor is configured to combine the intermediate sample values according to a weighted combination, in which a weighting applied to an intermediate sample value derived from reference samples non-adjacent to the current image region increases with increasing separation of the set of reference samples, from which that intermediate sample value as generated, from the current sample to be predicted.

In examples, the intra-image predictor is configured to combine the reference sample values according to a weighted combination, in which a weighting applied to a reference sample value non-adjacent to the current image region increases with increasing separation of the set of reference samples containing that reference sample value, from the current sample to be predicted.

Various different options of these combinations can be tested as trial encodings and one selected, for example according to a lowest sum of absolute differences (SAD) amongst those tested, for use in encoding, with the selection being indicated by parameter data communicated as part of the compressed data stream.

Alternatively reference samples in sub-groups in rows/columns could be combined using the techniques of FIG. 20, to form sub-combinations which can then be processed using the techniques shown in FIGS. 21 and 22. An example of this arrangement is given below for an example arrangement of four rows/columns of reference samples, numbered 1-4, where row/column 1 is spatially closest to the current block or region:

Rows/columns 1 & 2:
generate first combined reference samples as in FIG. 20
generate a first intermediate predicted sample value from the first combined reference sample values
Rows/columns 3 & 4:
generate second combined reference samples as in FIG. 20
generate a second intermediate predicted sample value from the second combined reference sample values
Then:
generate a final predicted sample value p from the first and second intermediate predicted sample values.

Various options will now be discussed relating to the number of rows and columns of reference samples. Again, as before, the examples are discussed with relation to an 8×8 block 2400 of samples to be predicted, but the same techniques are applicable to other sizes and/or shapes of blocks.

Note however that in some examples, certain block sizes and/or shapes may be excluded or restricted in their application of the present techniques, for example small blocks, such as blocks having either dimension equal to four samples or fewer.

Also, in the operation of an intra mode selector as discussed below, certain directional modes may be excluded from the present techniques.

Therefore, FIGS. 21 and 22 provide examples in which the intra-image predictor is configured to derive the predicted samples by interpolating amongst one or more sets of reference samples. For example, the intra-image predictor can be configured to interpolate amongst two or more sets of reference samples (such as (a, c, e) and (b, d, f) in FIG. 21, or (c, e, g) and (b, d, f) in FIG. 22) to derive a respective intermediate sample value p1, p2 from each set of reference samples, and to combine the intermediate sample values to derive the predicted sample p. In example arrangements set of reference samples comprises samples from a respective one or the two or more parallel arrays 2070, 2075 of reference samples. In the example of FIG. 22, based around the reference positions 2090, 2095, each set of reference samples comprises a set, in the respective array of reference samples, pointed to by the prediction direction. As discussed above, the intra-image predictor 530 can be configured to combine the intermediate sample values according to a weighted combination, in which a weighting applied to an intermediate sample value decreases with increasing separation of the set of reference samples, from which that intermediate sample value as generated, from the current region (so that in the example given above, a weighting of 0.6 is applied to the closer array 2070 and a weighting of 0.4 is applied to the further array 2075) or the current sample to be predicted.

Figure 23:
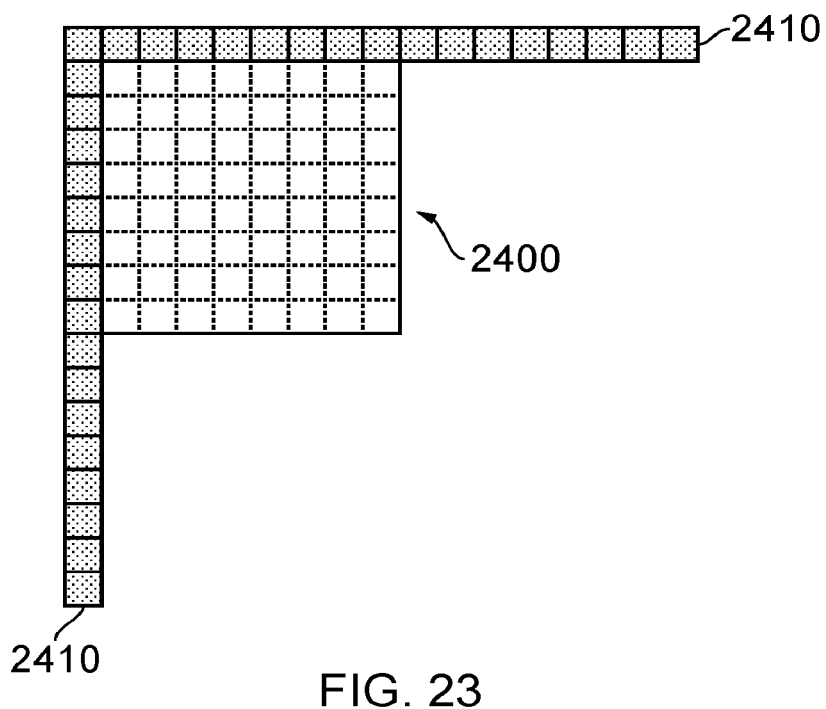
FIGS. 23 to 26 schematically illustrate respective groups of rows and columns of reference samples.

FIG. 23 schematically illustrates a single row/column 2410 of reference samples. If this was the only option available to the intra predictor, the operation would correspond to a previously proposed intra predictor, but the use of a single row/column 2410 could be provided in an intra predictor forming an embodiment of the present disclosure in the context of its optional selection (by the intra mode selector) in combination with the optional selection (by the intra mode selector) of one or more other techniques shown in FIGS. 24 to 26.

Figure 24:
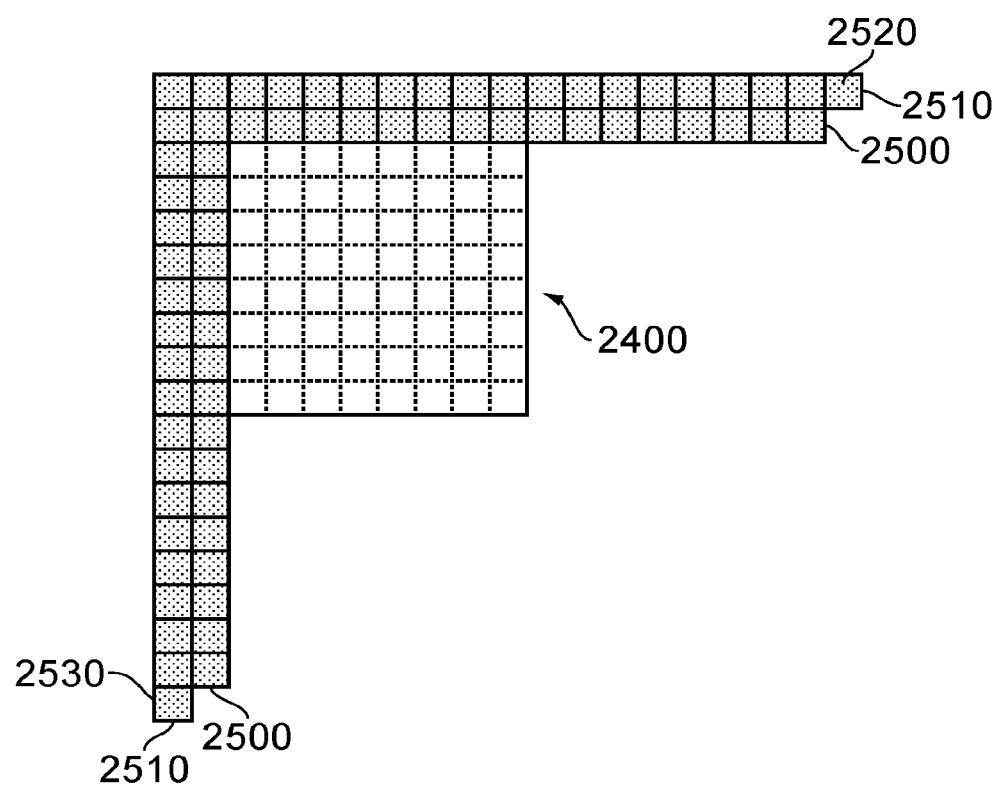

FIG. 24 shows a pair of rows/columns 2500, 2510 in which, as discussed above, the row/column 2510 is extended by one or more samples 2520, 2530 so as to allow for the use of the full range of prediction directions discussed above.

Figure 25:
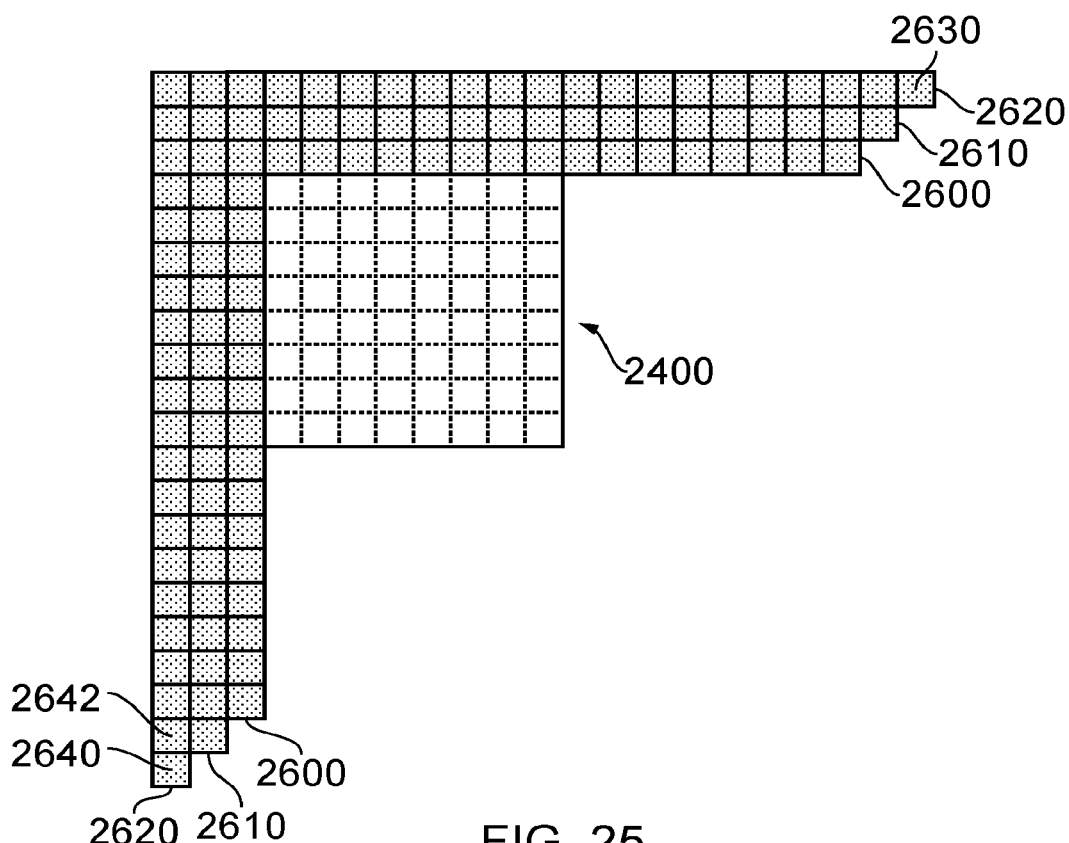
Figure 26:
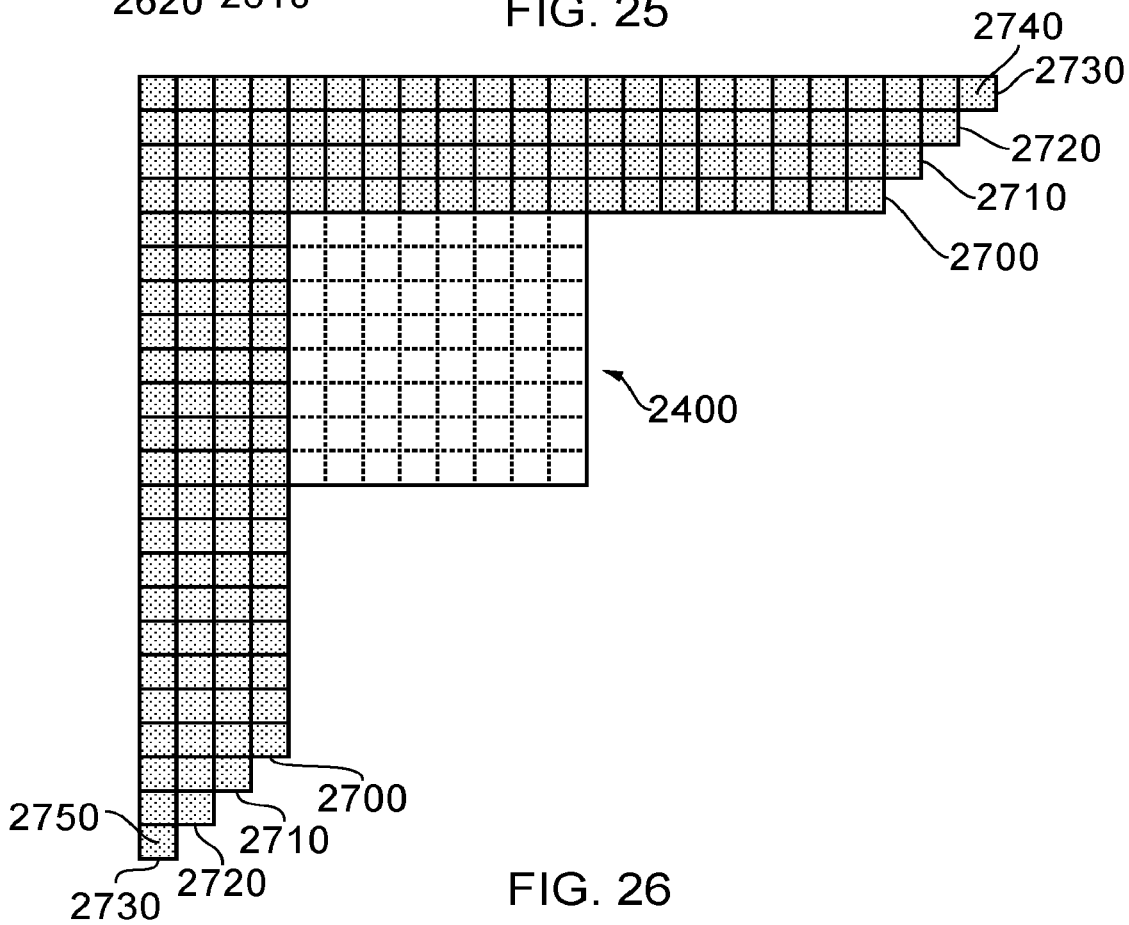
Figure 27:
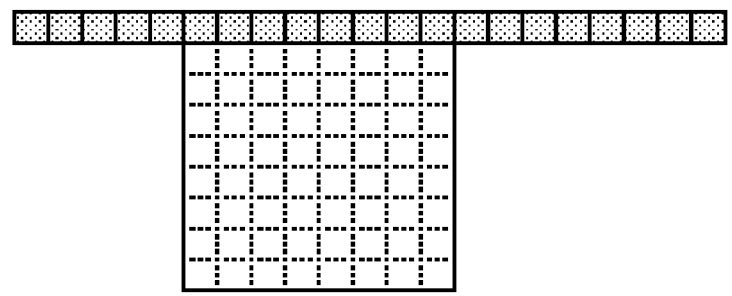
FIGS. 27 to 30 schematically represent respective projected versions of FIGS. 23 to 26.
Figure 28:
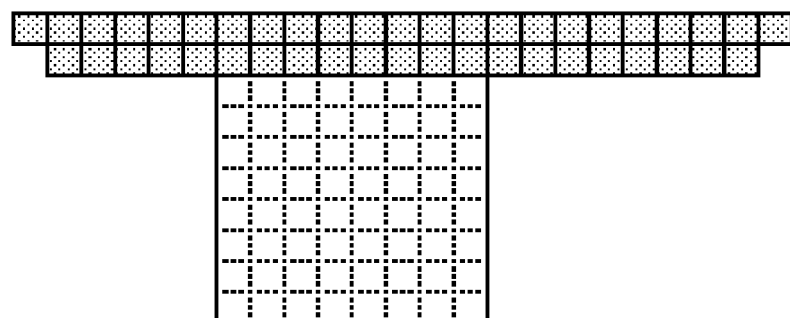
Figure 29:
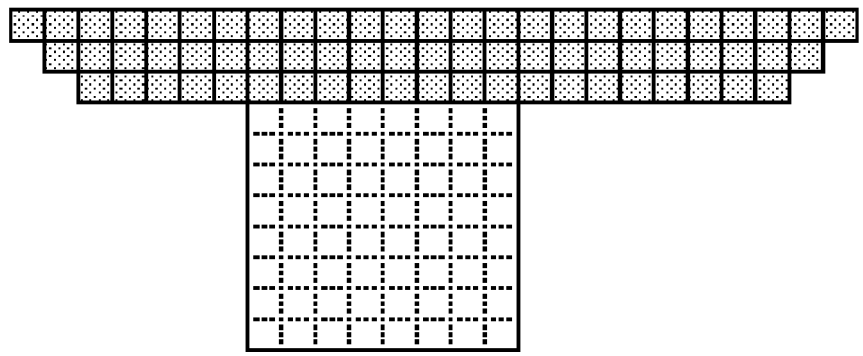
Figure 30:
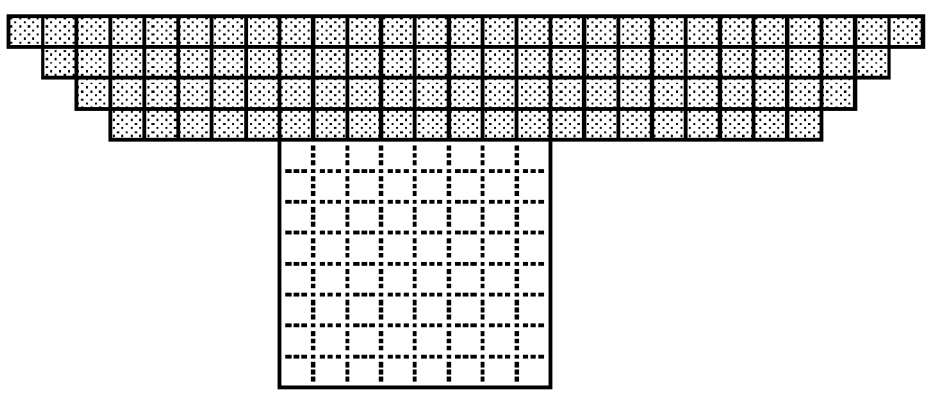

Similarly, FIG. 25 schematically represents three rows/columns of reference samples 2600, 2610, 2620. The row/column 2620 is extended by one or more samples 2630, 2640 with respect to the second row/column 2610, for the same reasons.

Finally as an example, although not representing a limit on the number of rows/columns which can be used, FIG. 23 schematically illustrates four rows/columns of reference samples, mainly rows/columns 2700, 2710, 2720, 2730. Once again, the row/column 2730 is extended by one or more reference samples 2740, 2750 with respect to the third row/column 2720, for the same reasons as those discussed above.

FIGS. 27-30 show, for the example cases of FIGS. 23-26 respectively, a projected version of the multiple rows/columns of reference samples (shown as shaded blocks in FIGS. 27-30). Note that in at least some examples, the projection process can be dependent upon the prediction direction in use, so a single example for an arbitrary prediction direction is employed in FIGS. 27-30. With respect to the projected reference sample, a similar technique employed to that in FIG. 17 can be used to derive reference positions and reference samples to apply the technique of FIG. 19.

FIG. 31 schematically represents at least part of an operation of an intra mode selector such as the intra mode selector 520 of FIG. 8 described above.

The intra mode selector can operate to detect an appropriate mode for use in intra prediction of a current block or region with respect to a set of reference samples 3205. Various techniques have been proposed for achieving this, such as (at least partial) trial encoding and/or analysis of properties of the reference samples, to select the prediction operation amongst the candidate prediction operations.

In the present examples, any of these techniques can be used, with (in some example arrangements) the techniques being repeated, or applied in multiple instances, in respect of multiple permutations of the number of rows/columns of reference samples.

Here, the term "permutation" is used to indicate a group of rows/columns of reference samples. The group might include a row/column spatially nearest to the current block or region, and zero or more next-adjacent rows/columns each progressively spatially further away from the current block or region.

The term "prediction operation" can be used to describe a mode or direction and/or an associated permutation of rows/columns. Therefore, the intra-mode selector can, in example embodiments, be configured to select, from a set of candidate prediction operations each defining at least a prediction direction, a prediction operation for prediction of samples of a current region of a current image, the current region comprising an array of two or more rows and two or more columns of samples. The intra-image predictor is configured to derive predicted samples of the current region with respect to one or more of a group of reference samples of the same image in dependence upon a prediction direction, defined by the selected prediction operation, between a current sample to be predicted and a reference position amongst the reference samples. For at least some of the candidate prediction operations, the group of reference samples comprises two or more parallel linear arrays (such as rows, columns, rows and columns (noting that a row and column are still a linear array even with a "corner"), and/or projected arrays) of reference samples disposed at different respective separations from the current region.

The intra mode selector comprises a mode properties detector 3200 which acts to detect the encoding properties of each mode under test (and, in at least some examples, of each mode with each permutation Pn of numbers n of rows/columns of reference samples available with that mode, where n ranges from 1 to a maximum limit of at least two). A coding efficiency detector 3210 detects the coding efficiency for each mode/permutation tested by the mode properties detector 3200. The coding efficiency can relate to aspects such as the amount of data needed to encode the residual image which would arise where that mode and permutation of rows/columns to be used, along with the amount of data needed to signal the use of that mode/permutation.

In the selection of a prediction direction, example arrangements test all 34 directional modes with a simple SAD (sum of absolute differences) test to derive a shortlist of modes most likely to be useful for the current block. The shortlist of modes is then tested with a full encode to select a prediction mode for use.

The current techniques using multiple rows and/or columns of reference samples may in some situations be slower (or have higher processing requirements) than using a single row/column. To alleviate this at the encoder side where such a decision is made and then communicated to the decoder, example arrangements may be arranged to use the multi row/column prediction only for testing the shortlist of modes.

Based on the detection by the coding efficiency detector 3210, a mode selector 3220 selects a prediction mode 3230 to be sent to the intra predictor 530, and information 3240 is also sent to a mode encoder 3245 such as a part of the controller 343 which encodes data 3250 forming part of the encoded data stream indicating the mode/permutation in use, which is to say, data identifying the prediction operation selected for each region of the image.

Therefore, this provides an example in which the intra mode selector is configured to select amongst two or more groups of reference samples, each group comprising a respective different number of parallel arrays of reference samples.

FIGS. 32 and 33 are respective schematic flow charts representing possible methods of operation of the intra mode selector of FIG. 31.

In FIG. 32, steps 3300 . . . 3310, carried out in as many instances (whether in series, as schematically illustrated here, or in parallel) as there are available permutations P of rows/columns of reference samples, relate to the mode properties detector 3200 and coding efficiency detector 3210 detecting a best mode using each possible permutation of rows/columns of reference samples. So, a best mode may be selected using a single row/column of reference samples, another best mode may be selected using two rows/columns of reference samples and so on. Then, at a step 3320, the coding efficiency detector 3210 detects the efficiencies of each of the modes and permutations detected at the step 3300 . . . 3310 so that at a step 3330 the mode selector 3220 selects a single mode and permutation of rows/columns and the mode encoder 3245 encodes information defining the selected mode and permutation.

In an alternative mode of operation in FIG. 33, an initial stage during the encoding process is to establish use of a particular permutation of n rows/columns (where n is at least two, so the permutation might be two rows/columns) and communicate this to the decoder in, for example, a parameter set, at a step 3400. Then, at a step 3410, the mode properties detector 3200, the coding efficiency detector 3210 and the mode selector 3220 cooperate to select a best prediction mode using the particular established permutation of rows/columns and at a step 3420 the mode encoder 3425 encodes information defining that mode.

At the decoder side, an intra mode selector is shown by way of example in FIG. 34, comprising an encoded data detector 3500 which detects data such as the data 3250 in the encoded data stream defining a particular mode (and optionally a set of rows/columns) to be used, and a mode selector 3510 provides information 3520 to the intra predictor 530 indicating which mode and permutation of rows/columns to use, that is to say, it is configured to detect encoded data identifying the prediction operation selected for each region of the image.

FIGS. 35 and 36 are respective flow charts schematically representing methods of operation of an intra predictor such as the intra predictor 530 of FIG. 8.

FIG. 35 relates primarily to the operations shown in FIGS. 21 and 22 above, in which, at a step 3600, an intermediate predicted sample value such as the intermediate predicted sample value p2 is interpolated from a first set of reference samples, for example the set in a closest row/column of reference samples to the current block or region, and then, using as many iterations as there are rows/columns of reference samples, a step 3610 represents the interpolation of an intermediate predicted sample value p1 from each remaining set of reference samples from a respective row/column of reference samples. As discussed above, for those rows/columns of reference samples further away from the current block or region than the closest row/column of reference sample, the selection of which reference samples to use could be, for example, by detecting a reference position in each row/column according to the prediction direction or by using corresponding locations to those identified in the closest row/column. Then, at a step 3620, the intermediate predicted sample values are combined, for example by a weighted mean, to generate the final predicted sample value.

FIG. 36 relates more to the process shown in FIG. 20, in which at a step 3700, respective members of the two or more sets of reference samples (with sets other than the set in the closest row/column being defined for example by tracking a further reference position along the prediction direction) into a combined set (h, i, j of FIG. 20), and then interpolating a predicted sample value p from the combined set a step 3710.

Figure 37:
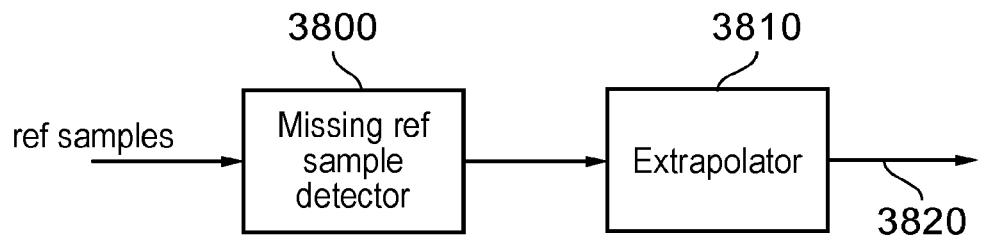
FIG. 37 schematically illustrates a part of the functionality of an intra predictor.

As an optional feature of the operation of the intra predictor, FIG. 37 schematically illustrates a technique for providing the additional reference samples 2520, 2530, 2630, 2640, 2740, 2750, or at least some of them, without necessarily having to simply repeat nearby or adjacent reference samples.

Referring to FIG. 37, a missing reference sample detector 3800 detects that a reference sample is not available. This could be because a sample at that position has not yet necessarily been decoded. In some examples, the sample has not been decoded. In other examples, a sample could have been decoded, but because it lies outside a current coding unit it could be that the hardware requirements such as buffering needed to make that reference sample available for the current prediction would be unreasonably high and so a design decision is taken such that the sample is not provided for prediction. For example, referring to FIGS. 25 and 26, these considerations may indicate that the samples 2530, 2640, 2642 are not available if they are outside the current coding unit. To address these issues, in example arrangements an extrapolator 3810 generates the required value 3820 using an extrapolation process based on multiple ones of the available reference samples. Operation of this arrangement is shown by schematic flowchart of FIG. 38 in which a step 3900 relates to the detection by the detector 3800 of the missing reference samples and a step 3910 relates to the extrapolation by the extrapolator 3810 of the required values.

Further examples illustrating the use of missing reference sample detection will be discussed below.

Figure 39:
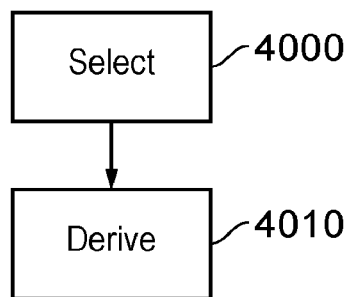
FIGS. 39 and 40 are schematic flowcharts illustrating respective methods.

FIG. 39 is a schematic flowchart illustrating an image encoding method comprising:
  selecting (at a step 4000), from a set of candidate prediction operations each defining at least a prediction direction, a prediction operation for prediction of samples of a current region of a current image, the current region comprising an array of two or more rows and two or more columns of samples; and
  deriving (at a step 4010) intra-image predicted samples of the current region with respect to one or more of a group of reference samples of the same image in dependence upon a prediction direction, defined by the selected prediction operation, between a current sample to be predicted and a reference position amongst the reference samples;
  in which, for at least some of the candidate prediction operations, the group of reference samples comprises two or more parallel linear arrays of reference samples disposed at different respective separations from the current region.

Figure 40:
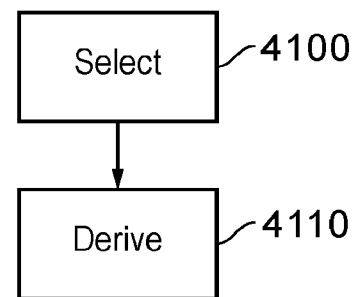

FIG. 40 is a schematic flowchart illustrating an image encoding method comprising:
  selecting (at a step 4100), from a set of candidate prediction operations each defining at least a prediction direction, a prediction operation for prediction of samples of a current region of a current image, the current region comprising an array of two or more rows and two or more columns of samples; and
  deriving (at a step 4110) intra-image predicted samples of the current region with respect to one or more of a group of reference samples of the same image in dependence upon a prediction direction, defined by the selected prediction operation, between a current sample to be predicted and a reference position amongst the reference samples;
  in which, for at least some of the candidate prediction operations, the group of reference samples comprises two or more parallel linear arrays of reference samples disposed at different respective separations from the current region.

In at least some of the example arrangements discussed above, the use of multiple rows or columns of reference samples may be constrained to instances where the "extra" (non-adjacent) rows or the multiple columns (or both) lie in the same coding tree unit as the current block. These conditions can be applied individually or together. Such arrangements will now be described further.

Figure 41:
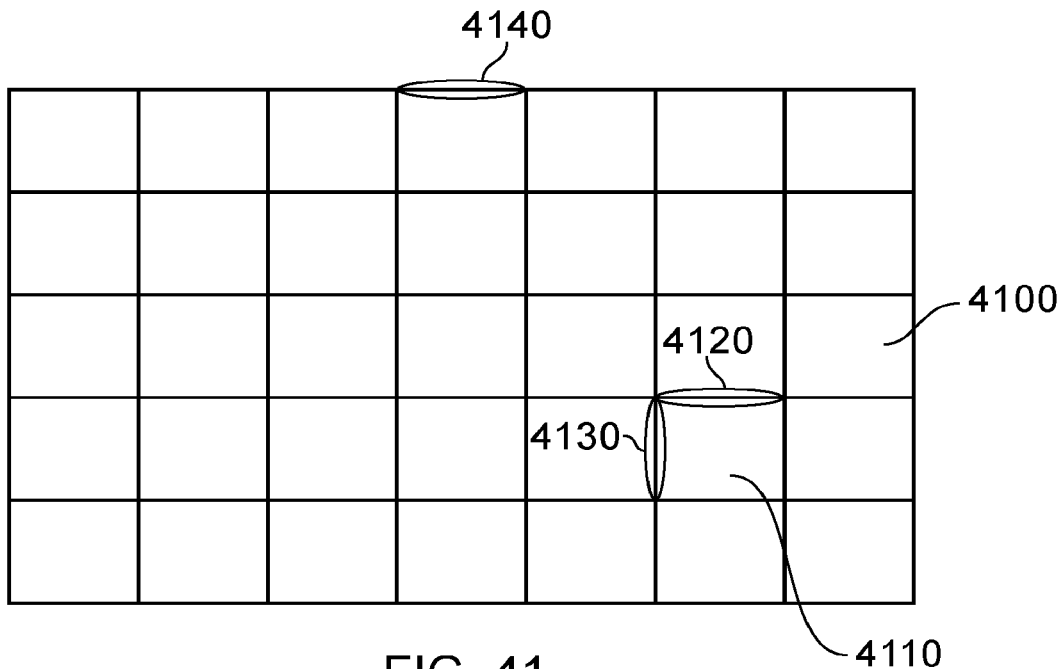
FIG. 41 schematically illustrates an array of coding units.

FIG. 41 schematically illustrates an array of coding units, in an example arrangement in which the image encoding apparatus is configured to encode the current image as successive coding units 4100 of samples.

It will be appreciated from the discussion of FIG. 9 above that in at least some embodiments, coding takes place, coding unit by coding unit, from top left to bottom right of the set of coding units 4100. This means that for image regions at the extreme edges (the top edge and/or the left edge in this example) of a coding unit, it may be the case that at least some samples which would be required as reference samples in plural linear arrays as discussed above may or may not be available, depending on how much (if any) of a preceding decoded coding unit has been buffered. For example, for a particular coding unit 4110, prediction at the top 4120 and/or the left 4130 of the coding unit may be affected in this way. For coding units at the left and/or top of the image, the required reference sample data may not exist at all.

Note that the top left to bottom right encoding order is merely an example. If another order were used, the edges being considered here may be different to the top and left edges currently under discussion. Note also that the shape of the coding units shown in the schematic diagram of FIG. 41 may or may not be representative of the actual shape or relative sizes of the coding units.

Figure 42:
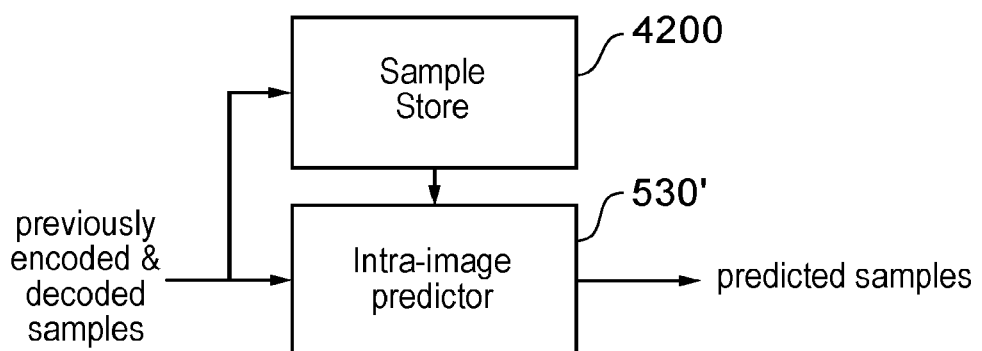
FIG. 42 schematically illustrates a sample predictor.

FIG. 42 schematically illustrates a sample predictor 530', similar to the intra-image predictor 530 of FIG. 8 but explicitly showing a sample store 4200 to store samples corresponding to a region of the current image other than the current region. In particular, the sample store 4200 can be arranged to store previously encoded and decoded samples from one or more coding units adjacent to the coding unit in which the current region is located, for use as reference samples in respect of (for example) an image region at a location within the current coding unit adjacent to a previous coding unit.

Figures 43, 44:
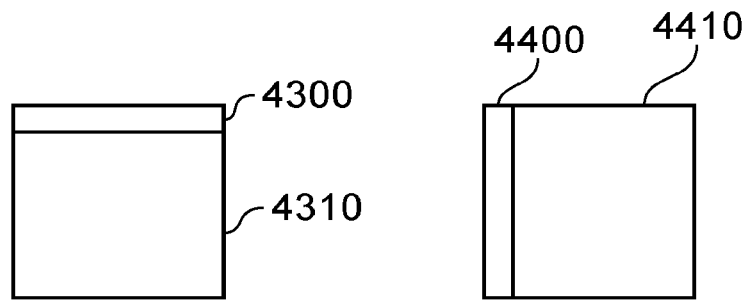
FIGS. 43 and 44 schematically illustrate reference sample storage.

FIGS. 43 and 44 schematically illustrate reference sample storage by the sample store 4200. In some examples, such as that shown schematically in FIG. 43, the sample store 4200 may be configured as a line store to store one or more lines or rows of previously encoded and decoded samples from a coding unit directly above a current coding unit 4310.

Here, it is noted that line stores are considered to be relatively "expensive", the term implying that they can require a significant amount of memory storage for their implementation, which can in turn require a significant amount of logic circuitry in, for example, an integrated circuit implementation of an encoder and/or decoder. The provision of line stores therefore represents a compromise between the potentially heavy requirements in terms of logic circuitry and the potential improvements in coding efficiency provided by the present techniques in which multiple rows and/or columns of reference samples may be used. Such reference samples may be readily available within a particular coding unit, but access to reference samples from outside the current coding unit can potentially be restricted by the implementation (or lack of implementation) of sample storage such as the sample store 4200.

In FIG. 44, a column of samples 4400 from a previously encoded and decoded coding unit to the left of the current coding unit 4410 is stored for use as reference samples in respect of a left hand column of regions of the coding unit 4410.

It will be appreciated that the sample store 4200 could store samples above (as in FIG. 43) and to the left of (as in FIG. 44) the current coding unit. It will be appreciated that one or more rows (and/or columns) of samples could be stored. It will be appreciated that a sample store 4200 may not in fact be provided.

FIG. 45 schematically represents an intra mode selector arrangement of the type shown in FIG. 31, except that the mode selector 3220' (similar in most respects to the mode selector 3220) is responsive to a detector 4500 configured to detect whether samples corresponding to any of the two or more parallel linear arrays of reference samples are unavailable for use in prediction of samples of the current region and, if any of the two or more parallel linear arrays of reference samples are unavailable, to inhibit selection, by the intra mode selector 3220', of a candidate prediction operation dependent upon the unavailable reference samples.

Figure 38:
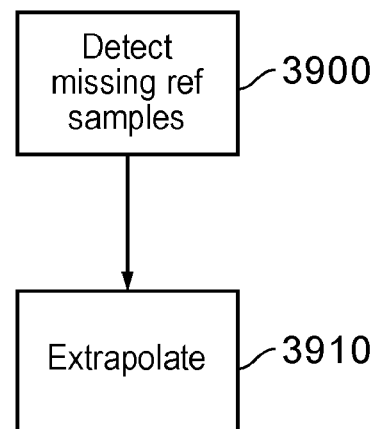
FIG. 38 is a schematic flowchart representing operations of the arrangement of FIG. 37.

Note that this can be a separate test and mechanism to the arrangement of FIG. 38. In the present test, it is detected whether any of the two or more parallel linear arrays of reference samples are unavailable for example, because the current region is at a peripheral position with respect to a coding unit and/or image, and/or because any of the two or more parallel linear arrays of reference samples are not buffered (for example in line stores). A sample-by-sample extrapolation process of the type used in FIG. 38 is not applied, but instead, candidate prediction modes which use the unavailable rows/columns are inhibited from being selected.

Similarly, the detector 4500 is further configured to detect for a current region of a current image which, if any, of the two or more parallel linear arrays are available for use in prediction of samples of the current region and to allow selection as a prediction operation, by the selector, of a candidate prediction operation dependent upon at least one of the available parallel linear arrays. Therefore in example embodiments the detector 4500 allows or disallows the selection of modes by the selector 3220' in dependence upon whether, for the current image region, the required rows and/or columns of reference samples are available (for example, stored or buffered).

The detector 4500 is in turn responsive to configuration data 4510 defining the presence or absence of the sample store 4200 and in particular defining how many (if any) rows and/or columns of samples of a previous adjacent coding unit it holds for use as reference samples in respect of image regions of the current coding unit.

Significantly, the configuration data 4510 may define the lower of: (a) which stores are present at the decoder side and (b) which stores are available or present at the encoder side. This is because the selected mode will ultimately need to be implemented at the decoder, but the mode cannot be implemented in encoding unless the relevant stores are also present at the encoder side. If the encoded data is to be ultimately decoded by a known decoder, the properties of that decoder can be provided as the configuration data 4510. If however the decoder is unknown, then it may be that the configuration data 4510 defines zero sample stores (even if one or more are present at the encoder) so as not to allow the generation of encoded data that cannot be decoded by an arbitrary decoder. In other examples, if a decoder standard, whether an official standard, a proprietary standard or a de facto industry standard, specifies that (for example) one line store (or a generic number n of line stores) must always be present, then for an unknown decoder the configuration data 4510 can be arranged to specify n line stores, assuming that n line stores are available at the encoder.

In this way, the detector 4500 can be responsive to configuration data defining one or more parameters of a decoding apparatus to detect whether samples corresponding to any of the two or more parallel linear arrays of reference samples will be available for use in prediction of samples of the current region at the decoding apparatus.

The detector 4500 is also responsive to location information 4520 defining the image location of the current image region with respect to the image and/or the current coding unit. If the current image region is adjacent a left or upper edge of the image then the detector can be configured to detect that multiple rows and/or columns of reference samples are unavailable. If the current image region is adjacent a left and/or upper edge of a coding unit, then the detector can be configured to detect that multiple rows and/or columns of reference samples are unavailable unless the configuration data 4510 defines that such samples are held by sample stores 4200. Therefore, in these examples, the detector is configured to detect whether, for an image region at a location within a coding unit adjacent to a previous coding unit, any of the two or more parallel linear arrays of reference samples are held by the sample store.

FIGS. 46 to 49 are schematic diagrams illustrating prediction processes, showing example operations of the detector 4500 to detect whether the current region is adjacent an edge of the current region such that sample locations corresponding to at least some of the two or more parallel linear arrays of reference samples lie outside the current image.

Figure 46:
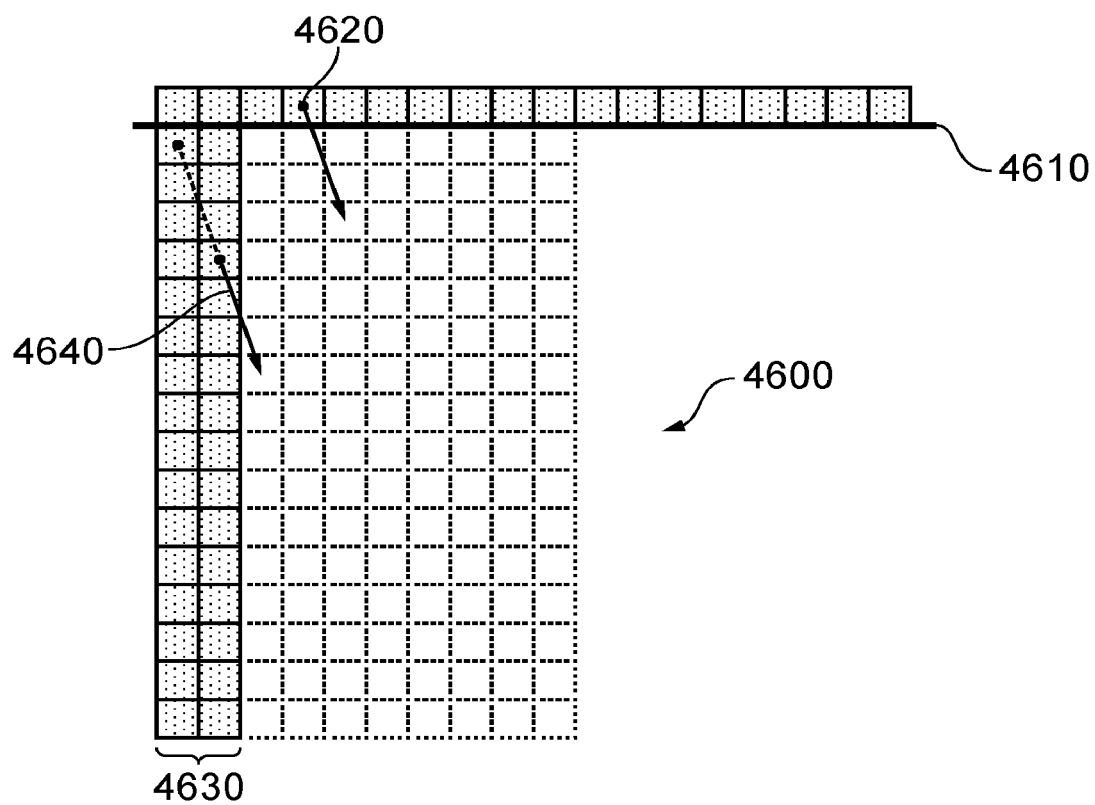
FIGS. 46 to 49 are schematic diagrams illustrating prediction processes.
Figure 47:
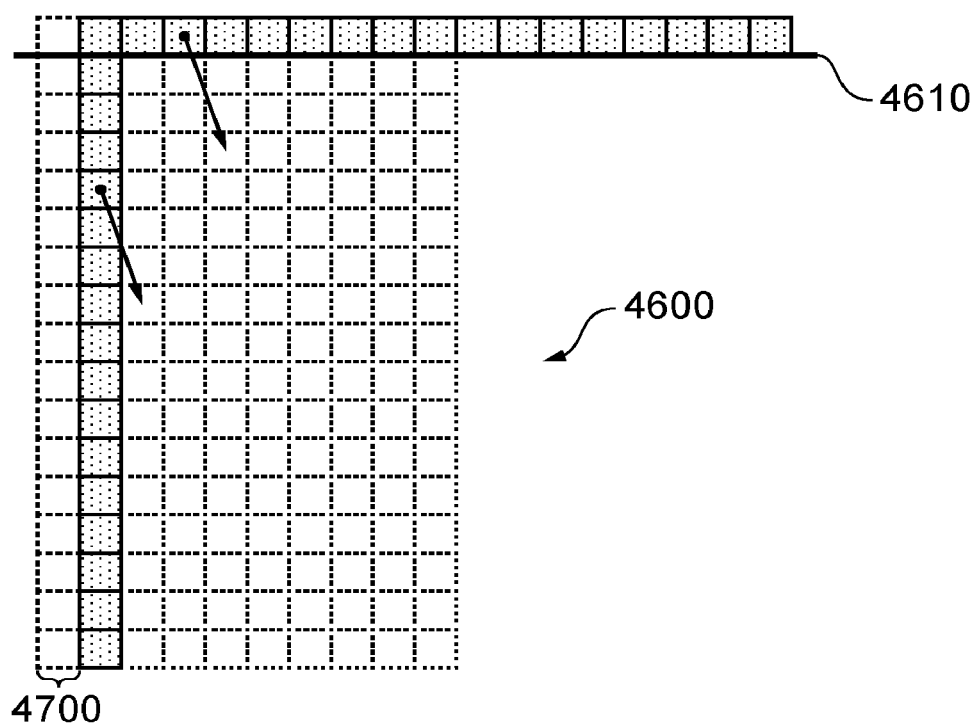

In FIGS. 46 and 47, an image region 4600 being encoded or decoded is at the top of its respective coding unit. The boundary with the next-above coding unit is schematically represented by a bold line 4610. In this example instance a sample store 4200 providing one line store is used, so that one line of samples from the next-above coding unit is available for use as reference samples. A second row of reference samples is not available above the image region 4600.

In FIG. 46, a single row of reference samples is used for predictions involving a reference position amongst the reference samples above the image region 4600, such as a reference position 4620. However, because (in the example of FIG. 46) two or more columns of samples 4630 are available to the left of the region 4600 for use as reference samples, predictions involving a reference position amongst the reference samples to the left of the image region 4600, such as a prediction represented by an arrow 4640, use two columns or linear arrays of reference samples.

In FIG. 47, only a single linear array (row, column) is used for prediction for all reference sample locations so that a consistent technique is used in respect of all of the predictions. This is done even because the second row above is not available; even though the second column 4700 is available it is unused.

Figure 48:
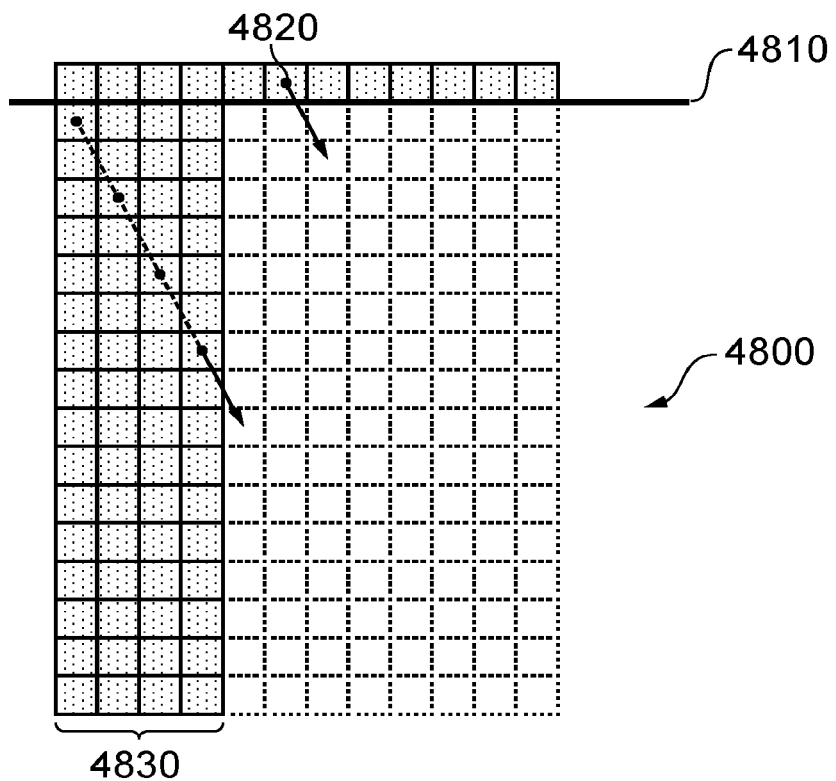

In FIGS. 48 and 49, once again the current image region 4800 is at the top of a coding unit (with the boundary 4810 being shown by a bold line). In FIG. 48, one line store is available, and in FIG. 49 two line stores are available.

In FIG. 48, single row prediction is used for reference sample positions above the current image region 4800 such as a reference sample position 4820, but for reference sample positions to the left, four column 4830 prediction (using any of the techniques described above) can d be used. This applies to reference sample locations which do not use row data but only column data.

Figure 49:
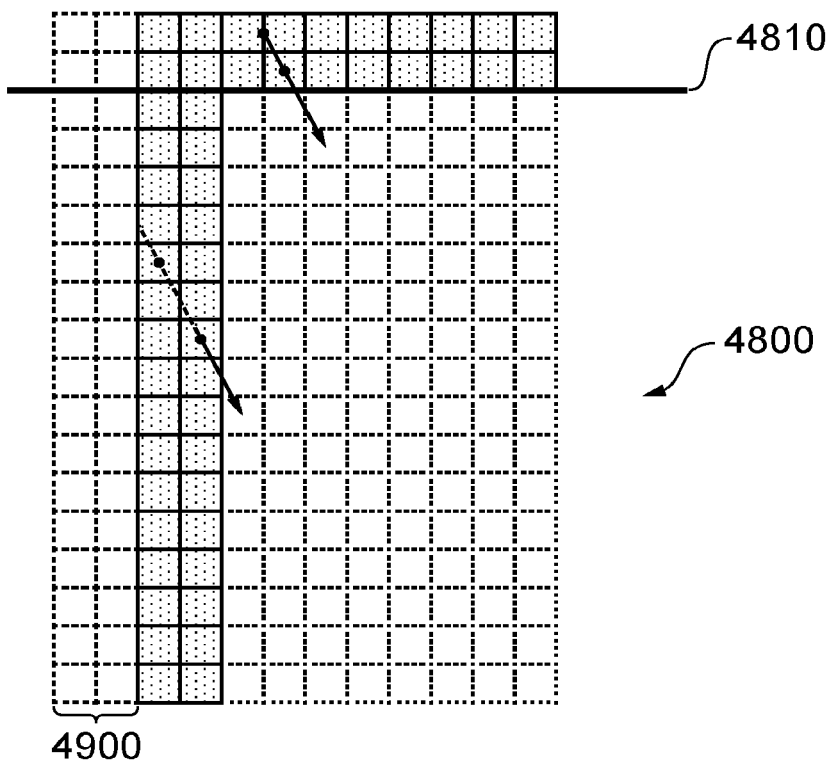

In FIG. 49, an extra line store is used (or in other words, two line stores are provided) so a double row/column prediction is used for all sample locations. Although a third and fourth column 4900 are available they are unused, so as to provide a consistent approach, although other examples could use two rows for reference sample positions above the current region and four columns for reference sample positions to the left of the current region.

Note that in all of the embodiments described here, for multiple rows/columns the prediction may be a weighted sum but this might be for example a 0:100:0:0 weighting rather than necessarily a 25:25:25:25 weighting (where the four weightings are in order of array separation from the current image region, for example, the first, second, third and fourth adjacent rows/columns). This could be implemented as a multiplexer.

Accordingly, in at least FIGS. 46 and 48 the detector 4500 is configured to detect, separately for reference sample positions disposed vertically or horizontally with respect to the current image region, whether samples corresponding to any of the two or more parallel linear arrays of reference samples are unavailable for use in prediction of samples of the current region (being, for example, all candidate prediction modes except those which rely on line stores or sample provision which are not present in respect of the current region) and, if any of the two or more parallel linear arrays of reference samples are unavailable for reference sample positions disposed vertically or horizontally with respect to the current image region, to inhibit selection, by the selector, of a candidate prediction operation dependent upon the unavailable reference samples. Note that the detection can take place region by region, since the presence or absence of line stores is generally relevant only to the top row of regions and/or to modes which rely on samples above the current region.

In the situation such as at the top of the image (as shown by 4140 in FIG. 41), regardless of what local buffering is present, samples above a current region may not be available simply because the current region is at the very top of the image. In such circumstances predetermined value (for example grey) samples can be substituted for the reference samples. The detector 4500 can detect this situation from the location information 4520 and control the detector 4500 so as to disallow use of modes other than those which rely on the predetermined reference samples. Therefore in example embodiments, for at least some of the candidate prediction operations, the group of reference samples comprises one or more predetermined values; and the detector 4500 is further configured to detect for a current region of a current image if none of the two or more parallel linear arrays is available for use in prediction of samples of the current region and to allow selection as a prediction operation, by the selector, of a candidate prediction operation for that current region dependent upon the predetermined values as reference samples.

At the decoder side, corresponding detections, derivations and control operations by the detector could be carried out, or alternatively the nature of the encoding could be communicated to the decoder in the same way as that described with reference to FIG. 34 described above.

FIGS. 50 and 51 are schematic flowcharts illustrating respective methods.

FIG. 50 is a schematic flowchart illustrating an image encoding method comprising:

- selecting (at a step S000), from a set of candidate prediction operations each defining at least a prediction direction, a prediction operation for prediction of samples of a current region of a current image, the current region comprising an array of two or more rows and two or more columns of samples;
- deriving (at a step S010) intra-image predicted samples of the current region with respect to one or more of a group of reference samples of the same image in dependence upon a prediction direction, defined by the selected prediction operation, between a current sample to be predicted and a reference position amongst the reference samples;
- in which, for at least some of the candidate prediction operations, the group of reference samples comprises two or more parallel linear arrays of reference samples disposed at different respective separations from the current region;
- detecting (at a step S020) whether samples corresponding to any of the two or more parallel linear arrays of reference samples are unavailable for use in prediction of samples of the current region and inhibiting (at a step S030) selection by the selecting step, if any of the two or more parallel linear arrays of reference samples are unavailable, of a candidate prediction operation dependent upon the unavailable reference samples.

FIG. 51 is a schematic flowchart illustrating an image decoding method comprising:

- selecting (at a step S100), from a set of candidate prediction operations each defining at least a prediction direction, a prediction operation for prediction of samples of a current region of a current image, the current region comprising an array of two or more rows and two or more columns of samples;
- deriving (at a step S110) intra-image predicted samples of the current region with respect to one or more of a group of reference samples of the same image in dependence upon a prediction direction, defined by the selected prediction operation, between a current sample to be predicted and a reference position amongst the reference samples;
- in which, for at least some of the candidate prediction operations, the group of reference samples comprises two or more parallel linear arrays of reference samples disposed at different respective separations from the current region;
- detecting (at a step S120) whether samples corresponding to any of the two or more parallel linear arrays of reference samples are unavailable for use in prediction of samples of the current region and
- inhibiting (at a step S130) selection by the selecting step, if any of the two or more parallel linear arrays of reference samples are unavailable, of a candidate prediction operation dependent upon the unavailable reference samples.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective aspects and features are defined by the following numbered clauses:

1. An image encoding apparatus comprising:
   a selector configured to select, from a set of candidate prediction operations each defining at least a prediction direction, a prediction operation for prediction of samples of a current region of a current image, the current region comprising an array of two or more rows and two or more columns of samples; and
   an intra-image predictor configured to derive predicted samples of the current region with respect to one or more of a group of reference samples of the same image in dependence upon a prediction direction, defined by the selected prediction operation, between a current sample to be predicted and a reference position amongst the reference samples;
   in which, for at least some of the candidate prediction operations, the group of reference samples comprises two or more parallel linear arrays of reference samples disposed at different respective separations from the current region.

2. Apparatus according to clause 1, in which the intra-image predictor is configured to derive the predicted samples by interpolating amongst one or more sets of reference samples.

3. Apparatus according to clause 2, in which the intra-image predictor is configured to interpolate amongst two or more sets of reference samples to derive a respective intermediate sample value from each set of reference samples, and to combine the intermediate sample values to derive the predicted sample.

4. Apparatus according to clause 3, in which each set of reference samples comprises samples from a respective one or the two or more parallel arrays of reference samples.

5. Apparatus according to clause 4, in which each set of reference samples comprises a set, in the respective array of reference samples, or of values interpolated from the respective array of reference samples, pointed to by the prediction direction.

6. Apparatus according to clause 3 or clause 4, in which the intra-image predictor is configured to combine the intermediate sample values according to a weighted combination, in which a weighting applied to an intermediate sample value decreases with increasing separation of the set of reference samples, from which that intermediate sample value as generated, from the current region.

7. Apparatus according to clause 3, in which the intra-image predictor is configured to combine the intermediate sample values according to a weighted combination, in which a weighting applied to an intermediate sample value derived from reference samples non-adjacent to the current image region increases with increasing separation of the set of reference samples, from which that intermediate sample value as generated, from the current sample to be predicted.

8. Apparatus according to any one of the preceding clauses, in which the intra-image predictor is configured to combine two or more sets of reference samples to derive intermediate reference sample values, and to derive the predicted sample from the intermediate reference sample values.

9. Apparatus according to clause 8, in which the intra-image predictor is configured to derive the predicted samples by interpolating amongst the intermediate reference samples.

10. Apparatus according to clause 8 or clause 9, in which each set of reference samples comprises samples from a respective one or the two or more parallel arrays of reference samples.

11. Apparatus according to clause 10, in which each set of reference samples comprises a set, in the respective array of reference samples, pointed to by the prediction direction.

12. Apparatus according to clause 8, in which the intra-image predictor is configured to combine the reference sample values according to a weighted combination, in which a weighting applied to a reference sample value decreases with increasing separation of the set of reference samples containing that reference sample value, from the current region.

13. Apparatus according to clause 8, in which the intra-image predictor is configured to combine the reference sample values according to a weighted combination, in which a weighting applied to a reference sample value non-adjacent to the current image region increases with increasing separation of the set of reference samples containing that reference sample value, from the current sample to be predicted.

14. Apparatus according to clause 8, in which the intra-image predictor is configured to combine the two or more parallel linear arrays of reference samples to form a linear array of reference samples.

15. Apparatus according to any one of the preceding clauses, in which the selector is configured to select amongst two or more groups of reference samples, each group comprising a respective different number of parallel arrays of reference samples.

16. Apparatus according to any one of the preceding clauses, in which the selector is configured to perform at least a partial encoding to select the prediction operation amongst the candidate prediction operations.

17. Apparatus according to any one of the preceding clauses, in which the controller is configured to encode data identifying the prediction operation selected for each region of the image.

18. Video storage, capture, transmission or reception apparatus comprising apparatus according to any one of the preceding clauses.

19. An image decoding apparatus comprising:
   a selector configured to select, from a set of candidate prediction operations each defining at least a prediction direction, a prediction operation for prediction of samples of a current region of a current image, the current region comprising an array of two or more rows and two or more columns of samples; and
   an intra-image predictor configured to derive predicted samples of the current region with respect to one or more of a group of reference samples of the same image in dependence upon a prediction direction, defined by the selected prediction operation, between a current sample to be predicted and a reference position amongst the reference samples;

in which, for at least some of the candidate prediction operations, the group of reference samples comprises two or more parallel linear arrays of reference samples disposed at different respective separations from the current region.

20. Apparatus according to clause 19, in which the intra-image predictor is configured to derive the predicted samples by interpolating amongst one or more sets of reference samples.

21. Apparatus according to clause 20, in which the intra-image predictor is configured to interpolate amongst two or more sets of reference samples to derive a respective intermediate sample value from each set of reference samples, and to combine the intermediate sample values to derive the predicted sample.

22. Apparatus according to clause 21, in which each set of reference samples comprises samples from a respective one or the two or more parallel arrays of reference samples.

23. Apparatus according to clause 22, in which each set of reference samples comprises a set, in the respective array of reference samples, pointed to by the prediction direction.

24 Apparatus according to clause 21, in which the intra-image predictor is configured to combine the intermediate sample values according to a weighted combination, in which a weighting applied to an intermediate sample value decreases with increasing separation of the set of reference samples, from which that intermediate sample value as generated, from the current region.

25. Apparatus according to clause 19, in which the intra-image predictor is configured to combine two or more sets of reference samples to derive intermediate reference sample values, and to derive the predicted sample from the intermediate reference sample values.

26. Apparatus according to clause 25, in which the intra-image predictor is configured to derive the predicted samples by interpolating amongst the intermediate reference samples.

27. Apparatus according to clause 25, in which each set of reference samples comprises samples from a respective one or the two or more parallel arrays of reference samples.

28. Apparatus according to clause 27, in which each set of reference samples comprises a set, in the respective array of reference samples, pointed to by the prediction direction.

29 Apparatus according to clause 25, in which the intra-image predictor is configured to combine the reference sample values according to a weighted combination, in which a weighting applied to a reference sample value decreases with increasing separation of the set of reference samples containing that reference sample value, from the current region.

30. Apparatus according to clause 25, in which the intra-image predictor is configured to combine the two or more parallel linear arrays of reference samples to form a linear array of reference samples.

31. Apparatus according to any one of clauses 19 to 30, in which the selector is configured to select amongst two or more groups of reference samples, each group comprising a respective different number of parallel arrays of reference samples.

32. Apparatus according to any one of clauses 19 to 31, in which the controller is configured to detect encoded data identifying the prediction operation selected for each region of the image.

33. Video storage, capture, transmission or reception apparatus comprising apparatus according to any one of clauses 19 to 32.

34. An image encoding method comprising:
   selecting, from a set of candidate prediction operations each defining at least a prediction direction, a prediction operation for prediction of samples of a current region of a current image, the current region comprising an array of two or more rows and two or more columns of samples; and
   deriving intra-image predicted samples of the current region with respect to one or more of a group of reference samples of the same image in dependence upon a prediction direction, defined by the selected prediction operation, between a current sample to be predicted and a reference position amongst the reference samples;
   in which, for at least some of the candidate prediction operations, the group of reference samples comprises two or more parallel linear arrays of reference samples disposed at different respective separations from the current region.

35. Computer software which, when executed by a computer, causes the computer to carry out a method according to clause 34.

36. A machine-readable non-transitory storage medium which stores software according to clause 35.

37. A data signal comprising coded data generated according to the method of clause 34.

38. An image decoding method comprising:
   selecting, from a set of candidate prediction operations each defining at least a prediction direction, a prediction operation for prediction of samples of a current region of a current image, the current region comprising an array of two or more rows and two or more columns of samples; and
   deriving intra-image predicted samples of the current region with respect to one or more of a group of reference samples of the same image in dependence upon a prediction direction, defined by the selected prediction operation, between a current sample to be predicted and a reference position amongst the reference samples;
   in which, for at least some of the candidate prediction operations, the group of reference samples comprises two or more parallel linear arrays of reference samples disposed at different respective separations from the current region.

39. Computer software which, when executed by a computer, causes the computer to carry out a method according to clause 38.

40. A machine-readable non-transitory storage medium which stores software according to clause 39.

41. A video capture apparatus comprising an image sensor and the encoding apparatus of any one of clauses 1-17, decoding apparatus of any one of clauses 19-32 and a display to which the decoded images are output.

Further respective aspects and features are defined by the following numbered clauses:

1. An image encoding apparatus comprising:
   a selector configured to select, from a set of candidate prediction operations each defining at least a prediction direction, a prediction operation for prediction of samples of a current region of a current image, the current region comprising an array of two or more rows and two or more columns of samples;
   an intra-image predictor configured to derive predicted samples of the current region with respect to one or more of a group of reference samples of the same image in dependence upon a prediction direction, defined by the selected prediction operation, between a current sample to be predicted and a reference position amongst the reference samples;

in which, for at least some of the candidate prediction operations, the group of reference samples comprises two or more parallel linear arrays of reference samples disposed at different respective separations from the current region; and a detector configured to detect whether samples corresponding to any of the two or more parallel linear arrays of reference samples are unavailable for use in prediction of samples of the current region and, if any of the two or more parallel linear arrays of reference samples are unavailable, to inhibit selection, by the selector, of a candidate prediction operation dependent upon the unavailable reference samples.

2. Apparatus according to clause 1, in which the detector is further configured to detect for a current region of a current image which, if any, of the two or more parallel linear arrays are available for use in prediction of samples of the current region and to allow selection as a prediction operation, by the selector, of a candidate prediction operation dependent upon at least one of the available parallel linear arrays.

3. Apparatus according to clause 1 or clause 2, in which:

for at least some of the candidate prediction operations, the group of reference samples comprises one or more predetermined values;

the detector is further configured to detect for a current region of a current image if none of the two or more parallel linear arrays is available for use in prediction of samples of the current region and to allow selection as a prediction operation, by the selector, of a candidate prediction operation for that current region dependent upon the predetermined values as reference samples.

4. Apparatus according to any one of the preceding clauses, in which the detector is responsive to an image location of the current region.

5. Apparatus according to clause 4, in which the detector is configured to detect whether the current region is adjacent an edge of the current region such that sample locations corresponding to at least some of the two or more parallel linear arrays of reference samples lie outside the current image.

6. Apparatus according to clause 4 or clause 5, in which:

the image encoding apparatus is configured to encode the current image as successive coding units of samples;

the image encoding apparatus comprises a sample store to store samples corresponding to a region of the current image other than the current region; and the detector is configured to detect whether, for an image region at a location within a coding unit adjacent to a previous coding unit, any of the two or more parallel linear arrays of reference samples are held by the sample store.

7. Apparatus according to any one of the preceding clauses, in which the detector is configured to detect, separately for reference sample positions disposed vertically or horizontally with respect to the current image region, whether samples corresponding to any of the two or more parallel linear arrays of reference samples are unavailable for use in prediction of samples of the current region and, if any of the two or more parallel linear arrays of reference samples are unavailable for reference sample positions disposed vertically or horizontally with respect to the current image region, to inhibit selection, by the selector, of a candidate prediction operation dependent upon the unavailable reference samples.

8. Apparatus according to any one of the preceding clauses, in which the detector is responsive to configuration data defining one or more parameters of a decoding apparatus to detect whether samples corresponding to any of the two or more parallel linear arrays of reference samples will be available for use in prediction of samples of the current region at the decoding apparatus.

9. Video storage, capture, transmission or reception apparatus comprising apparatus according to any one of the preceding clauses.

10. An image decoding apparatus comprising:

a selector configured to select, from a set of candidate prediction operations each defining at least a prediction direction, a prediction operation for prediction of samples of a current region of a current image, the current region comprising an array of two or more rows and two or more columns of samples;

an intra-image predictor configured to derive predicted samples of the current region with respect to one or more of a group of reference samples of the same image in dependence upon a prediction direction, defined by the selected prediction operation, between a current sample to be predicted and a reference position amongst the reference samples;

in which, for at least some of the candidate prediction operations, the group of reference samples comprises two or more parallel linear arrays of reference samples disposed at different respective separations from the current region; and a detector configured to detect whether samples corresponding to any of the two or more parallel linear arrays of reference samples are unavailable for use in prediction of samples of the current region and, if any of the two or more parallel linear arrays of reference samples are unavailable, to inhibit selection, by the selector, of a candidate prediction operation dependent upon the unavailable reference samples.

11. Apparatus according to clause 10, in which the detector is further configured to detect for a current region of a current image which, if any, of the two or more parallel linear arrays are unavailable for use in prediction of samples of the current region and to allow selection as a prediction operation, by the selector, of a candidate prediction operation dependent upon at least one of the available parallel linear arrays.

12. Apparatus according to clause 10 or clause 11, in which:

for at least some of the candidate prediction operations, the group of reference samples comprises one or more predetermined values;

the detector is further configured to detect for a current region of a current image if none of the two or more parallel linear arrays is available for use in prediction of samples of the current region and to allow selection as a prediction operation, by the selector, of a candidate prediction operation for that current region dependent upon the predetermined values as reference samples.

13. Apparatus according to any one of clauses 10 to 12, in which the detector is responsive to an image location of the current region.

14. Apparatus according to clause 13, in which the detector is configured to detect whether the current region is adjacent an edge of the current region such that sample locations corresponding to at least some of the two or more parallel linear arrays of reference samples lie outside the current image.

15. Apparatus according to clause 13 or clause 14, in which:
the image decoding apparatus is configured to decode the current image as successive coding units of samples;
the image decoding apparatus comprises a sample store to store samples corresponding to a region of the current image other than the current region; and
the detector is configured to detect whether, for an image region at a location within a coding unit adjacent to a previous coding unit, any of the two or more parallel linear arrays of reference samples are held by the sample store.

16. Apparatus according to any one of clauses 10 to 15, in which the detector is configured to detect, separately for reference sample positions disposed vertically or horizontally with respect to the current image region, whether samples corresponding to any of the two or more parallel linear arrays of reference samples are unavailable for use in prediction of samples of the current region and, if any of the two or more parallel linear arrays of reference samples are unavailable for reference sample positions disposed vertically or horizontally with respect to the current image region, to inhibit selection, by the selector, of a candidate prediction operation dependent upon the unavailable reference samples.

17. Video storage, capture, transmission or reception apparatus comprising apparatus according to any one of clauses 10 to 16.

18. An image encoding method comprising:
selecting, from a set of candidate prediction operations each defining at least a prediction direction, a prediction operation for prediction of samples of a current region of a current image, the current region comprising an array of two or more rows and two or more columns of samples;
deriving intra-image predicted samples of the current region with respect to one or more of a group of reference samples of the same image in dependence upon a prediction direction, defined by the selected prediction operation, between a current sample to be predicted and a reference position amongst the reference samples;
in which, for at least some of the candidate prediction operations, the group of reference samples comprises two or more parallel linear arrays of reference samples disposed at different respective separations from the current region;
detecting whether samples corresponding to any of the two or more parallel linear arrays of reference samples are unavailable for use in prediction of samples of the current region and
inhibiting selection by the selecting step, if any of the two or more parallel linear arrays of reference samples are unavailable, of a candidate prediction operation dependent upon the unavailable reference samples.

19. Computer software which, when executed by a computer, causes the computer to carry out a method according to clause 18.

20. A machine-readable non-transitory storage medium which stores software according to clause 19.

21. A data signal comprising coded data generated according to the method of clause 18.

22. An image decoding method comprising:
selecting, from a set of candidate prediction operations each defining at least a prediction direction, a prediction operation for prediction of samples of a current region of a current image, the current region comprising an array of two or more rows and two or more columns of samples;
deriving intra-image predicted samples of the current region with respect to one or more of a group of reference samples of the same image in dependence upon a prediction direction, defined by the selected prediction operation, between a current sample to be predicted and a reference position amongst the reference samples;
in which, for at least some of the candidate prediction operations, the group of reference samples comprises two or more parallel linear arrays of reference samples disposed at different respective separations from the current region;
detecting whether samples corresponding to any of the two or more parallel linear arrays of reference samples are unavailable for use in prediction of samples of the current region and
inhibiting selection by the selecting step, if any of the two or more parallel linear arrays of reference samples are unavailable, of a candidate prediction operation dependent upon the unavailable reference samples.

23. Computer software which, when executed by a computer, causes the computer to carry out a method according to clause 22.

24. A machine-readable non-transitory storage medium which stores software according to clause 23.

The invention claimed is:

1. An image decoding apparatus comprising:
circuitry configured to:
select, from a set of candidate prediction operations each defining at least a prediction direction, a prediction operation for prediction of samples of a current region of a current image, the current region comprising an array of two or more rows and two or more columns of samples; and
derive predicted samples of the current region with respect to one or more samples of a group of reference samples of a same image based upon a prediction direction, defined by the selected prediction operation, between a current sample to be predicted and a reference position amongst the reference samples, wherein
the group of reference samples includes two or more parallel linear arrays of reference samples disposed at different respective separations from the current region, and
for at least some of the candidate prediction operations, the circuitry is further configured apply a weighting to one or more samples from at least two of the two or more parallel linear arrays,
wherein the weightings are based on a block size of the current region.

2. The image decoding apparatus as claimed in claim 1, wherein the circuitry is further configured to apply the weightings to two or more samples, the weightings being identical for the two or more samples.

3. The image decoding apparatus as claimed in claim 1, wherein the circuitry is further configured to apply the weightings to two or more samples, the weightings being different for at least two of the two or more samples.

4. The image decoding apparatus as claimed in claim 3, wherein
the at least two of the two or more samples have respective different separation distances from the current region, and
the weightings decrease based on the separation distances.

5. The image decoding apparatus as claimed in claim 1, wherein
the circuitry is further configured to apply the weightings to two or more samples, and
the weightings, when summed, add up to one.

6. The image decoding apparatus as claimed in claim 1, wherein
the circuitry is further configured to apply the weightings for a prediction direction to two or more samples, and
the weightings, when summed, add up to one.

7. The image decoding apparatus as claimed in claim 1, wherein
the circuitry is further configured to apply the weightings to two or more samples,
the weightings are different depending on the block size of the current region meeting a threshold size, for at least two of the two or more samples, and
the weightings are identical for at least two of the two or more samples when the threshold size is not met.

8. The image decoding apparatus as claimed in claim 1, wherein the circuitry is further configured to derive the predicted samples by interpolating amongst one or more sets of reference samples.

9. The image decoding apparatus as claimed in claim 8, wherein respective different weightings are applied by the circuitry for prediction directions in which two or more sets of reference samples are each interpolated to form interpolated reference samples from which the predicted samples are derived.

10. The image decoding apparatus as claimed in claim 9, wherein, for prediction directions which identify one set of reference samples, the weightings applied by the circuitry are identical for reference samples of the set.

11. A video storage, capture, transmission, or reception apparatus comprising the image decoding apparatus according to claim 1.

12. An image decoding method, comprising:
selecting, from a set of candidate prediction operations each defining at least a prediction direction, a prediction operation for prediction of samples of a current region of a current image, the current region comprising an array of two or more rows and two or more columns of samples; and
deriving predicted samples of the current region with respect to one or more samples of a group of reference samples of a same image based upon a prediction direction, defined by the selected prediction operation, between a current sample to be predicted and a reference position amongst the reference samples, wherein
the group of reference samples includes two or more parallel linear arrays of reference samples disposed at different respective separations from the current region, and
for at least some of the candidate prediction operations, the method includes applying, by circuitry, a weighting to one or more samples from at least two of the two or more parallel linear arrays, wherein the weightings are based on a block size of the current region.

13. The image decoding method as claimed in claim 12, wherein the applying step further comprises applying the weightings to two or more samples, the weightings being different for at least two of the two or more samples.

14. The image decoding method as claimed in claim 13, wherein
the at least two of the two or more samples have respective different separation distances from the current region, and
the weightings decrease based on the separation distances.

15. The image decoding method as claimed in claim 12, wherein the applying step further comprises applying the weightings to two or more samples for a prediction direction, wherein the weightings, when summed, add up to one.

16. The image decoding method as claimed in claim 12, wherein
the method further comprises applying the weightings to two or more samples,
the weightings are different depending on the block size of the current region meeting a threshold size, for at least two of the two or more samples, and
the weightings are identical for at least two of the two or more samples when the threshold size is not met.

17. The image decoding method as claimed in claim 12, wherein the deriving step further comprises deriving the predicted samples by interpolating amongst one or more sets of reference samples, wherein respective different weightings are applied for prediction directions in which two or more sets of reference samples are each interpolated to form interpolated reference samples from which the predicted samples are derived and wherein, for prediction directions which identify one set of reference samples, the weightings applied are identical for reference samples of the set.

18. A non-transitory storage medium comprising computer code components which, when executed on a computer, cause the computer to perform the method according to claim 12.

19. An image encoding method, comprising:
selecting, from a set of candidate prediction operations each defining at least a prediction direction, a prediction operation for prediction of samples of a current region of a current image, the current region comprising an array of two or more rows and two or more columns of samples; and
deriving predicted samples of the current region with respect to one or more samples of a group of reference samples of a same image based upon a prediction direction, defined by the selected prediction operation, between a current sample to be predicted and a reference position amongst the reference samples, wherein
the group of reference samples includes two or more parallel linear arrays of reference samples disposed at different respective separations from the current region, and
for at least some of the candidate prediction operations, the method includes applying, by circuitry, a weighting to one or more samples from at least two of the two or more parallel linear arrays,
wherein the weightings are based on a block size of the current region.

20. An image decoding apparatus comprising:
circuitry configured to:
select, from a set of candidate prediction operations each defining at least a prediction direction, a prediction operation for prediction of samples of a current region of a current image, the current region comprising an array of two or more rows and two or more columns of samples; and
derive predicted samples of the current region with respect to one or more samples of a group of reference samples of a same image based upon a prediction direction, defined by the selected prediction operation, between a current sample to be predicted and a reference position amongst the reference samples, wherein the group of reference samples includes two or more parallel linear arrays of reference samples disposed at different respective separations from the current region, for at least some of the candidate prediction operations, the circuitry is further configured apply a weighting to one or more samples from at least two of the two or more parallel linear arrays, and the circuitry is further configured to apply the weightings to two or more samples, the weightings being identical for the two or more samples.

21. An image decoding method, comprising:

selecting, from a set of candidate prediction operations each defining at least a prediction direction, a prediction operation for prediction of samples of a current region of a current image, the current region comprising an array of two or more rows and two or more columns of samples; and deriving predicted samples of the current region with respect to one or more samples of a group of reference samples of a same image based upon a prediction direction, defined by the selected prediction operation, between a current sample to be predicted and a reference position amongst the reference samples, wherein the group of reference samples includes two or more parallel linear arrays of reference samples disposed at different respective separations from the current region, for at least some of the candidate prediction operations, the method includes applying, by circuitry, a weighting to one or more samples from at least two of the two or more parallel linear arrays, and the deriving step further comprises deriving the predicted samples by interpolating amongst one or more sets of reference samples, wherein respective different weightings are applied for prediction directions in which two or more sets of reference samples are each interpolated to form interpolated reference samples from which the predicted samples are derived and wherein, for prediction directions which identify one set of reference samples, the weightings applied are identical for reference samples of the set.

* * * * *